United States Patent [19]

Hough et al.

[11] Patent Number: 5,367,661
[45] Date of Patent: Nov. 22, 1994

[54] TECHNIQUE FOR CONTROLLING CHANNEL OPERATIONS IN A HOST COMPUTER BY UPDATING SIGNALS DEFINING A DYNAMICALLY ALTERABLE CHANNEL PROGRAM

[75] Inventors: Roger E. Hough, Highland, N.Y.; Kazuo Iimura, Yamato, Japan; Kenya Ishimoto, Machida, Japan; Masao Nishimoto; Akio Saitoh, both of Tokyo, Japan; Kozo Sawada; Fumiaki Abe, both of Ichikawa, Japan; Goroh Sasaki, Yokohama, Japan; Stephen J. Schmandt, Tokyo, Japan

[73] Assignee: International Business Machines Corporation, Armonk, N.Y.

[21] Appl. No.: 978,856

[22] Filed: Nov. 19, 1992

[51] Int. Cl.$^5$ ................................ G06F 9/00
[52] U.S. Cl. .................... 395/500; 395/500; 395/275; 395/375
[58] Field of Search ............ 395/375, 275, 425, 400, 395/500, 550

[56] References Cited

U.S. PATENT DOCUMENTS

| | | | |
|---|---|---|---|
| 3,725,864 | 4/1973 | Clarke et al. | 340/172.5 |
| 4,056,843 | 11/1977 | Bishop et al. | 395/325 |
| 4,090,239 | 5/1978 | Twibell et al. | 395/550 |
| 4,320,456 | 3/1982 | Heise et al. | 364/200 |
| 4,322,793 | 3/1982 | Anderson et al. | 395/375 |
| 4,368,513 | 1/1983 | Meltzer | 395/425 |
| 4,373,179 | 2/1983 | Katsumata | 395/400 |
| 4,374,415 | 2/1983 | Cormier et al. | 395/275 |
| 4,419,728 | 12/1983 | Larson | 364/200 |
| 4,424,565 | 1/1984 | Larson | 364/200 |
| 4,453,211 | 6/1984 | Askinazi et al. | 395/500 |
| 4,459,661 | 7/1984 | Kaneda et al. | 395/400 |
| 4,602,329 | 7/1986 | Ohtake | 364/200 |
| 4,797,812 | 1/1989 | Kihara | 364/200 |
| 4,823,261 | 4/1989 | Bank et al. | 395/725 |
| 4,967,342 | 10/1990 | Lent et al. | 395/725 |
| 5,014,194 | 5/1991 | Itoh | 364/200 |

OTHER PUBLICATIONS

*Principles of Operation—IBM Enterprise Systems Architecture/370*, Publication No. SA22-7200-0, 1st Ed., Aug. 1988, pp. 2-1 to 2-6, 3-1 to 3-47 and 15-1 to 15-45.

L. H. Seawright et al., "UM/370-A Study of Multiplicity and Usefulness", *IBM Systems Journal*, vol. 18, No. 1, 1979, specifically the appendix on pp. 12-15.

L. E. Larson et al., "Program Channel Interrupt Chain Scheduling in a Paging Environment", *IBM Technical Disclosure Bulletin*, vol. 16, No. 4, Sep. 1973, pp. 1127-1129.

Primary Examiner—Parshotam S. Lall
Assistant Examiner—Zarni Maung
Attorney, Agent, or Firm—William B. Porter; Peter L. Michaelson

[57] ABSTRACT

A technique, specifically apparatus and an accompanying method, for use in, e.g., a "host" operating system (610), for properly updating a dynamically alterable channel program that controls an input/output (I/O) device so as to emulate a "guest" computer system, that employs dynamic address translation (DAT) in an I/O channel sub-system (150), on a "host" computer system (10) that does not. This technique performs this updating in a manner that significantly increases channel throughput so as to substantially reduce a performance degradation that would otherwise result from a lack of channel DAT on the host system. Specifically, our technique relies on program controlled interrupt (PCI) chaining coupled with use of "just-in-time" translation of each new virtual channel program segment generated by a guest operating system (620) and corresponding updating of channel program (415) then executing on the host computer system.

29 Claims, 12 Drawing Sheets

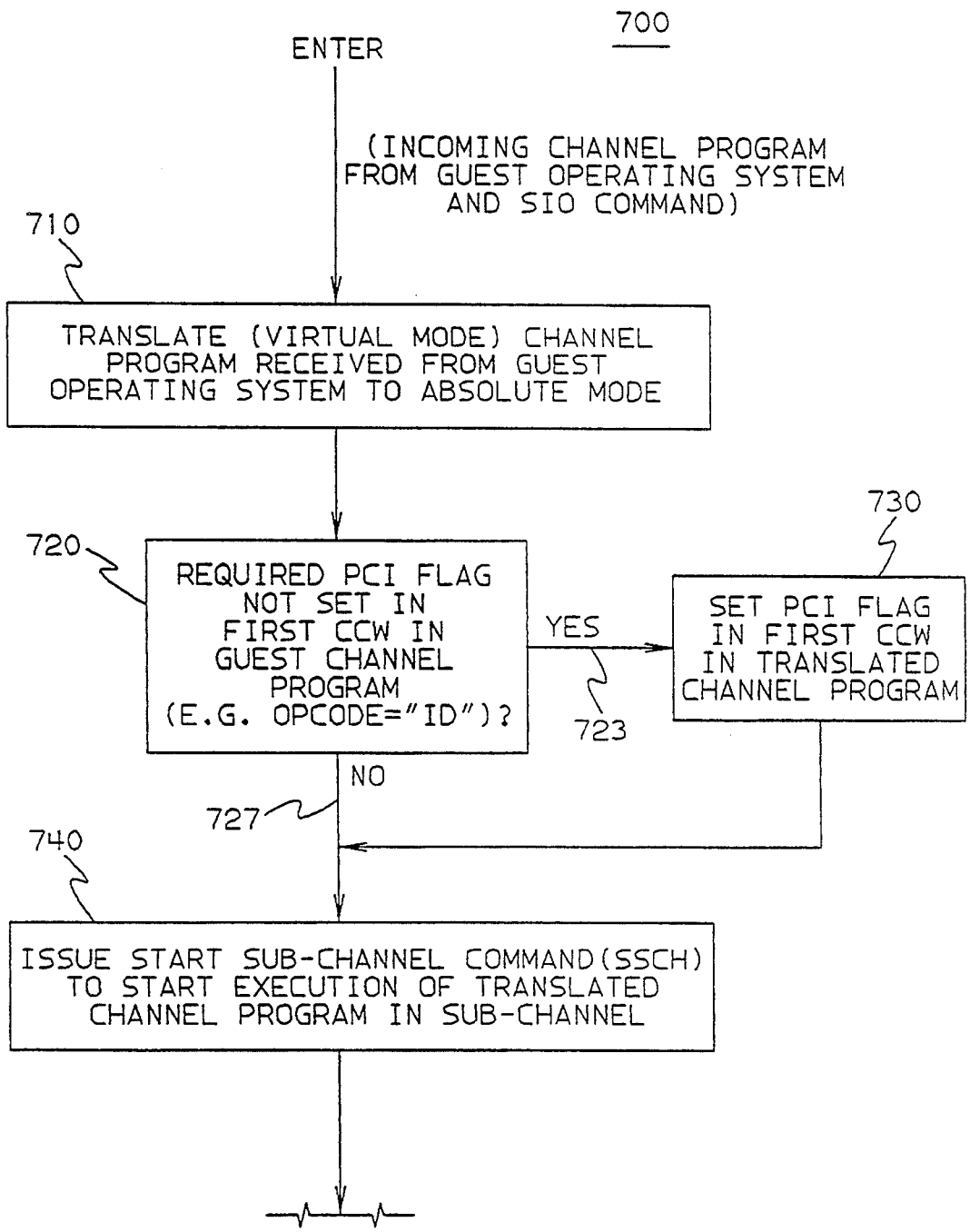

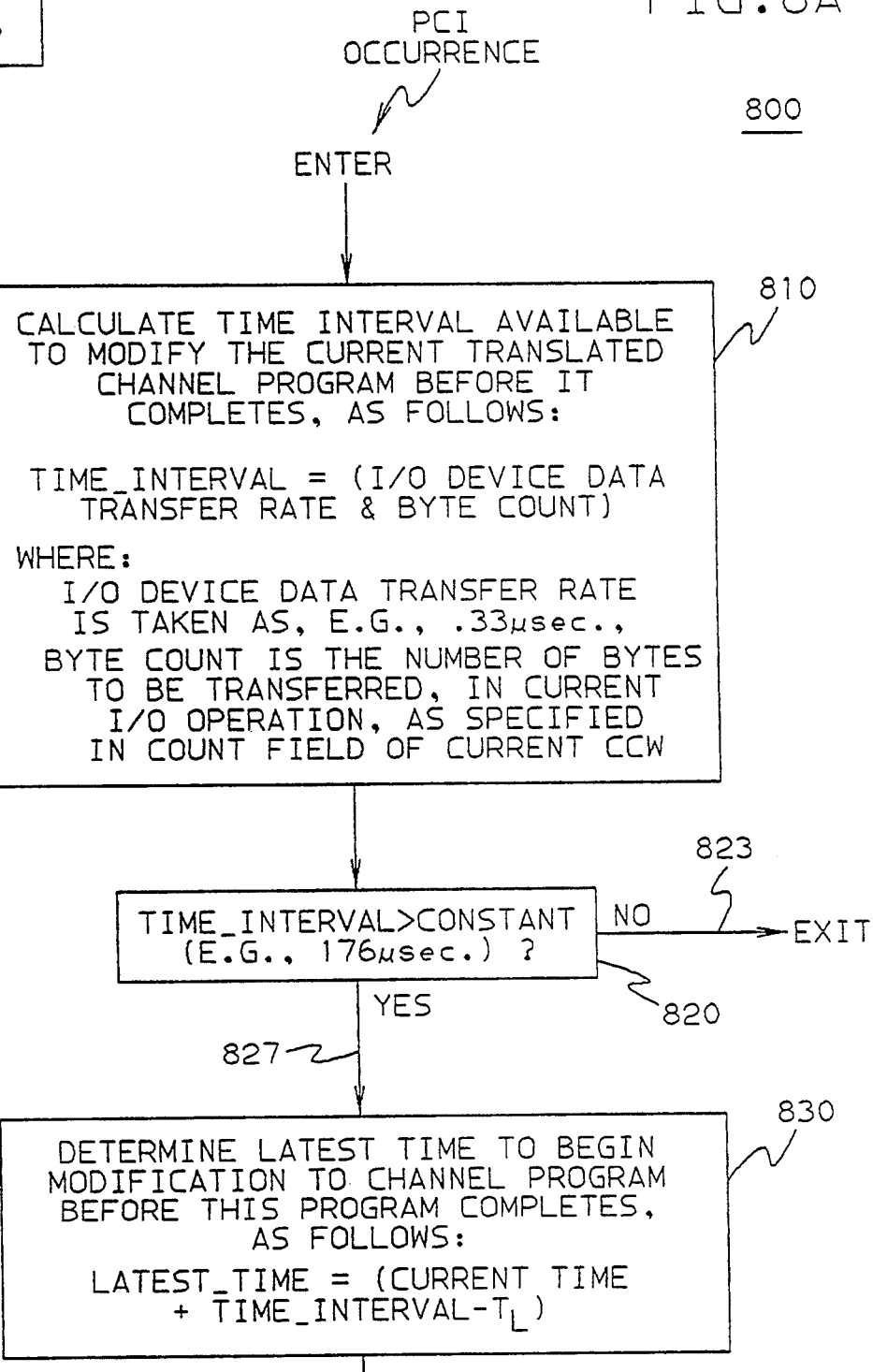

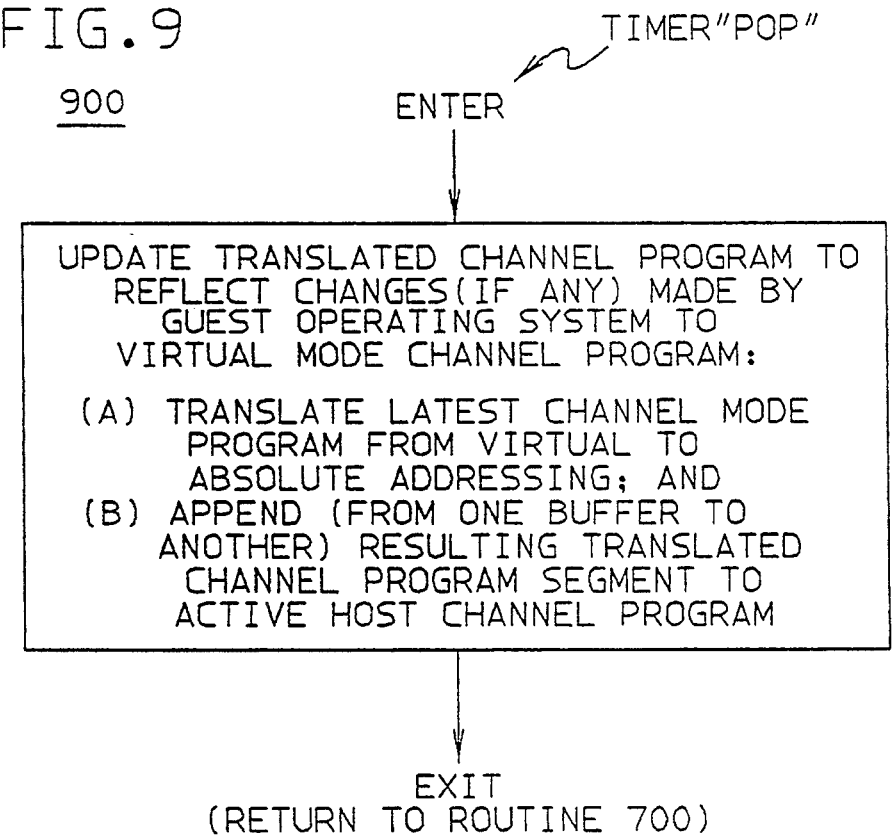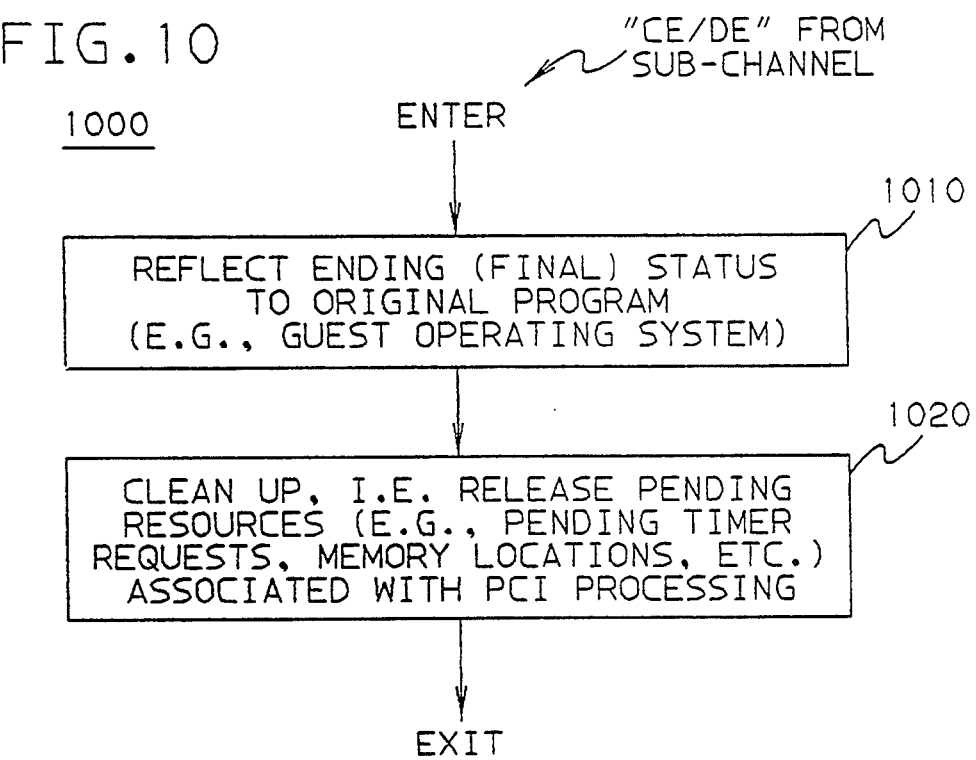

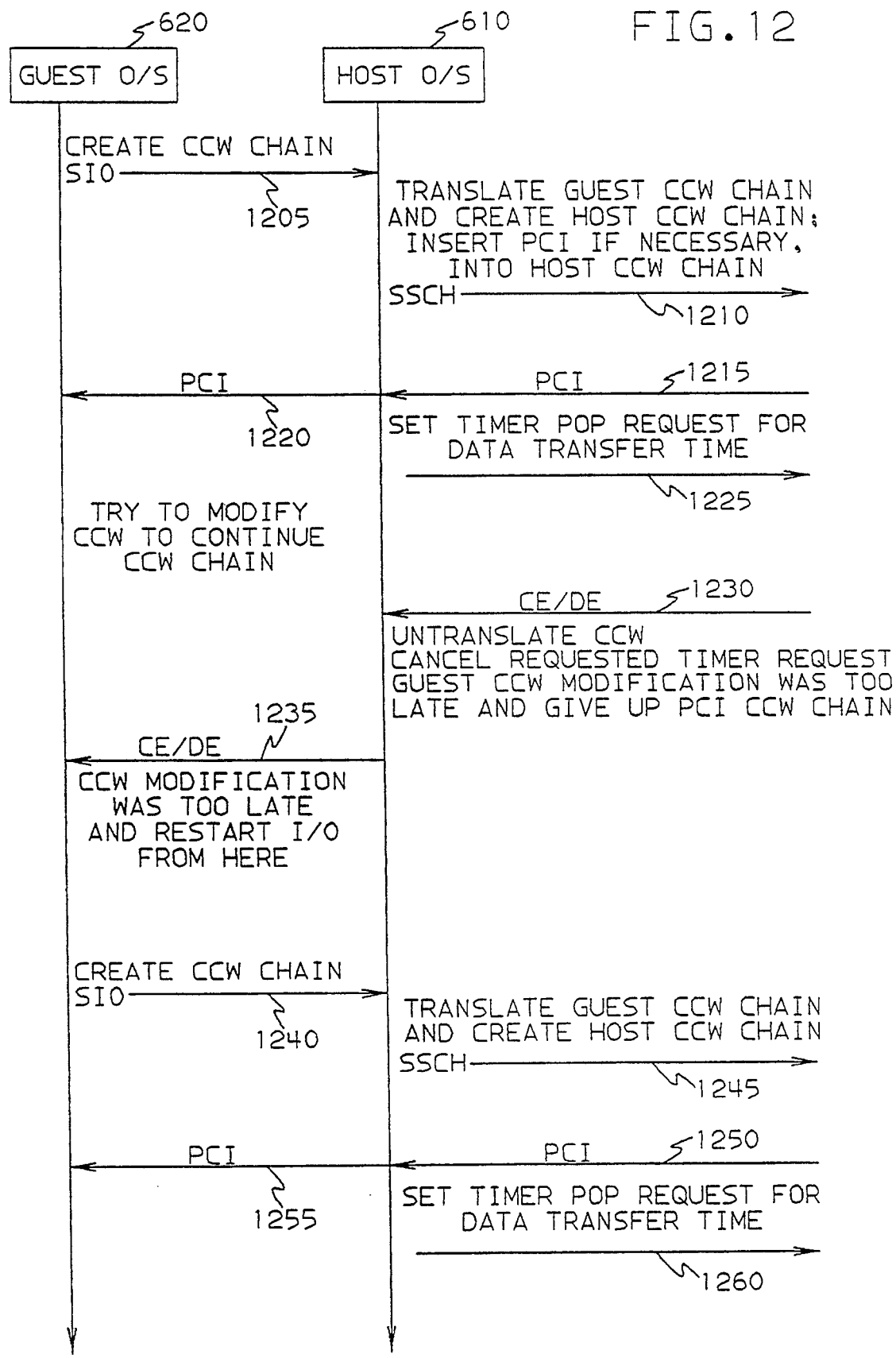

TECHNIQUE FOR CONTROLLING CHANNEL OPERATIONS IN A HOST COMPUTER BY UPDATING SIGNALS DEFINING A DYNAMICALLY ALTERABLE CHANNEL PROGRAM

BACKGROUND OF THE DISCLOSURE

1. Field of the Invention

The invention relates to a technique, specifically apparatus and an accompanying method, for use in, e.g., a "host" operating system, for updating a dynamically alterable channel program, that controls an input/output (I/O) device, so as to emulate a "guest" computer system, that employs dynamic address translation (DAT) in an I/O channel sub-system, on a host computer system that does not. This technique accomplishes this updating in a manner that significantly increases channel throughput and thus substantially reduces a performance degradation that would otherwise result from a lack of channel DAT on the host system.

2. Description of the Prior Art

Generally speaking, modern computers, particularly mainframe systems, are formed of a main storage, one or more central processing units (CPUs), operator facilities, a channel sub-system and various input/output (I/O) devices. The I/O devices are typified by direct access storage devices (DASDs), tape drives, keyboards, printers, displays and communications controllers.

Of particular relevance here, the channel sub-system controls and directs the flow of information between the main storage and typically each input/output (I/O) device. Such a sub-system advantageously relieves each central processing unit (CPU) in the computer system of a need to communicate directly with each I/O device, thereby permitting data processing to proceed concurrently with I/O processing. This, in turn, increases throughput of the entire computer. In use, the channel sub-system uses one or more so-called channel paths as a communication link to transfer and manage the flow of information to and from the I/O devices. As part of I/O processing, the channel sub-system tests for available channel paths, selects an available path to employ in connection with a particular I/O device then to be used, and initiates execution of an I/O operation over that path and through this device.

The channel sub-system contains sub-channels, each of which is associated with one or more channel paths. One sub-channel is typically provided for and dedicated to each I/O device that is accessible through the channel sub-system. Each sub-channel stores information concerning the associated I/O device and its particular attachment to the channel sub-system. Each sub-channel also stores information concerning I/O operations and other functions involving its associated I/O device. Any of this information can be accessed either by the CPU(s) in the computer system through use of I/O instructions or by channel sub-system itself and serves to provide communication, with respect to the associated I/O device, between any such CPU and the channel sub-system. The actual number of channels that is provided in any computer system can vary widely and is based on the configuration of that system, i.e. the specific architecture of the system without regard to the I/O devices.

Each I/O device is attached, through an associated control unit, to the channel sub-system via a channel path. Each such control unit may be attached to more than one channel path; an I/O device may be attached to more than one control unit. As such, a particular I/O device may be accessible to the channel sub-system over a number of different channel paths, with this number based upon the configuration of the overall computer system. For additional information regarding the channel sub-system and its functions, the reader is illustratively referred to Chapter 2, "Organization", of *Principles of Operation—IBM Enterprise Systems Architecture/370*, Publication Number SA22-7200-0, First Edition, Aug. 1988 (© 1988, International Business Machines Corporation) which, for simplicity, will be hereinafter referred to as the "ESA/370 Manual".

To use a channel, a CPU issues a so-called channel command word (CCW) for subsequent execution by the channel sub-system. For any sub-channel, each CCW specifies a command to be executed over that sub-channel. For commands that initiate certain I/O operations, each of the associated CCWs designates an area in main storage that is to be utilized with each of these operations and an action that will be taken whenever a transfer to or from that area is completed, as well as other options. A channel program consists of one or more CCWs that are logically linked such that all of these CCWs are fetched by the channel sub-system and executed in the specific sequence specified by a CPU program. To the extent relevant here, contiguous CCWS are linked by the use of chain-data or chain-command flags, and non-contiguous CCWs may be linked by a CCW specifying a "transfer-in-channel" command. A CCW becomes current when: (a) it is the first CCW of a channel program and has been fetched, (b) during command chaining, that CCW is logically fetched, or (c) during data chaining, that CCW takes over control of an I/O operation.

Given that CCWs control I/O operations involving main storage, these CCWs, particularly for various computer systems manufactured by the present assignee, typically contain absolute addresses, i.e. addresses assigned to actual physical locations in main storage. Absolute addresses are generated by attaching a prefix to a real address, the latter identifying a location situated in main storage. At any instant in time, a 1:1 correspondence exists between each real and absolute address for each CPU in a system configuration. For each of these CPUs, the value of the appropriate prefix is held in a so-called "prefix" register.

In contrast, each CPU generally utilizes virtual addresses to permit, inter alia, re-location of a program and its accompanying data, at any arbitrary moment, from storage at and execution within any one area of main storage to another such area. As far as a CPU program is concerned and to provide sufficient inter-program isolation, virtual address space is substantially larger than real address space. However, virtual addresses can not be used to address physical storage locations. Accordingly, prior to executing a given CPU program, a CPU, through typically a dynamic address translation (DAT) facility, first statically translates all the virtual addresses that reside within that program into corresponding real addresses. These real addresses are then converted, through subsequent prefixing, into corresponding absolute addresses. See, e.g., Chapter 3, "Storage", of the ESA/370 Manual. The absolute addresses are then used, through embedding within CCWs, to control subsequent I/O operations that are to be employed in conjunction with this program. In this regard, for so-called "direct data addressing", a desired area of main storage is designated through inclusion of a "data address field" within a CCW. This field specifies the physical location in the main storage of the first byte to be transferred (either by a read or write operation) through execution of this CCW. The number of remaining consecutive bytes to be transferred during execution of this CCW is specified in a so-called "count field" located within this CCW. For CCWs that invoke read, write, control and sense-ID operations, successive locations in the main storage are used in ascending, i.e., "forward", order (CCWs that invoke other operations may utilize descending or "backward" addressing). As such, as information is successively transferred for each of these operations, in byte-wise and ascending fashion, to or from main storage, the address from the data address field in the associated CCW is successively incremented and the count then existing in the count field is successively decremented for each such successive byte. When the value of the count field reaches zero, the storage area defined by the CCW is exhausted, and the associated I/O operation is completed. For further details, the reader should illustratively refer to Chapter 15, "Basic I/O Functions", of the ESA/370 manual Inasmuch as CCWs used within various computer systems manufactured by the present assignee, such as those which utilize the Enterprise Systems Architecture/370 (ESA/370) or series 9000 architecture, already contain absolute addresses, these systems do not need and hence do not include a separate facility in the channel sub-system that translates addresses stored within a CCW from virtual to real addresses.

Ordinarily, a given data processing facility will upgrade a computer system within a common "upwardly compatible" family of systems produced by a given manufacturer with, concomitantly, a user migrating his applications from one such system in the family to another such system and, as a result, experiencing enhanced performance. Through such upward compatibility from system to system within a given family, the effects of real (also absolute) and virtual addressing and address conversion therebetween remain substantially, if not totally, transparent to any such user of these systems. However, for various reasons, a recurring need has increasingly arisen in the user community to readily migrate CPU programs not just among systems within a given family but also, and in the context of both operating systems and application programs running thereunder, from a "target" computer system, produced by one manufacturer, on which these programs were originally intended to be executed, to a different computer system, i.e. a "host" system, produced by a different manufacturer, with the latter being typified by a system based, e.g., on the ESA/370 or series 9000 architecture.

While commercially available software migration facilities do exist to permit a particular target system to be emulated on a given host system and thereby facilitate migration from the target to the host, various incompatibilities often exist between the target and host systems which can compromise resulting performance of the migrated programs.

One such area of incompatibility involves channel DAT. Certain target computer systems employ a DAT facility located within the channel sub-system itself to dynamically translate channel program addresses; while certain host systems, such as a system that utilizes the ESA/370 or IBM series 9000 architecture, do not. If channel programs intended for execution on the former are instead executed on the latter through the existing migration facilities, a significant reduction in processing throughput may disadvantageously result.

In particular, during CPU program execution on certain computer systems, such as those that employ the ESA/370 or series 9000 architecture, channel programs can be dynamically extended by a CPU in order to undertake additional I/O operations, as required by the CPU program. This advantageously permits further information to be transferred between main storage and an I/O device then in use without a need to re-start the sub-channel each time. In that regard, the CPU program will illustratively build an "original" channel program, i.e. containing an initial CCW, to transfer an initial, i.e. first, record (block of information, e.g. program or data) on a disk track to main storage. Once this particular transfer is underway and the CPU program has executed further, the CPU program may require access, in seriatim, to a second, third and, very possibly, additional contiguously located data records stored on that same disk track. As such and to access the second record, the CPU program may likely append, through well known "command chaining" an additional CCW to the existing channel program in order to transfer the second record, and so forth for each additional successive record. Through use of command chaining, the sub-channel can transfer each such successive record without the necessity of the CPU, specifically an I/O supervisor within an operating system, having to repetitively issue a separate start sub-channel (SSCH) command for each of these records and re-establish the associated channel path, thereby saving channel execution time and providing increased channel throughput. Hence, through chaining, the last CCW in a channel program then executing will be modified to point to the next successive CCW, and so forth in order to chain all the successive CCWs together into a single channel program for the associated I/O device. Furthermore, as part of a process that modifies the channel program and to conserve storage, the CPU can also release locations in the main storage associated with newly used and hence now obsolete segments of this channel program.

Owing to inherent mechanical delays associated with electro-mechanical storage devices, such as disk rotation speed in a DASD, a channel program must keep ahead of its associated I/O device in order to maximize the data throughput of that device. For example, in the case of a DASD, as a channel program is repetitively extended through inclusion of additional CCWs to transfer a series of contiguous records between a common track on a disk and main storage, the channel sub-system, on behalf of the sub-channel, must be ready to execute each such CCW no later than at an instant in time when the disk mechanically rotates to a position where the first byte in the corresponding record lies directly under a read/write head. Of course, the disk continuously rotates regardless of the execution of the channel program. Consequently, in the event that execution of the channel program falls behind the I/O device, i.e. the starting location of the desired record advances beyond the read/write head before the corresponding CCW can be executed, then, before a transfer of this record can occur, sub-channel must wait for the disk to fully rotate, often nearly a complete revolution, to a position where this location is once again aligned with the read/write head. In the case of a tape drive, a sub-channel will experience a similar data transfer delay but associated with performing a tape drive shutdown sequence followed by a start-up sequence. Any such delays reduce the data throughput of the I/O device and slow the execution of the associated CPU program.

Consequently, to increase data throughput for the associated I/O device, channel programs can be dynamically altered, specifically extended, to accommodate each successive segment of the channel program, e.g. each successive CCW, as required by the CPU program, while that device is simultaneously performing an I/O operation for an immediately prior channel program segment. If each of these alterations is completed at the right time—no later than the end of the I/O operation for the immediately prior channel program segment, then the channel program and the I/O device can operate in synchronism with relatively little idle device time and hence significantly reduced data transfer delay.

With the above in mind, the existence of channel DAT can engender significant performance differences where a program originally intended to execute on a "target" computer system that employs channel DAT is actually executed, through a migration facility, on a "host" system that does not.

Specifically, in a target system that utilizes channel DAT (such as M-series type computers manufactured by Fujitsu, Ltd. of Japan), as the channel program is executed by the channel sub-system on behalf of a sub-channel, all addresses (both the addresses of the CCWs themselves and the addresses contained in the CCWs and used to access storage areas) are translated dynamically by the channel sub-system as it fetches CCWs and moves information to and from main storage. As with most programs, this channel program contains a beginning point and an end point. With channel DAT, as each new segment of channel program is built, by a target operating system executing on the CPU (such as the Fujitsu OS/IV MSP E20 operating system), that segment is simply supplied to a channel DAT facility. In response, this facility first translates that segment and then appends a resulting translated segment onto the existing channel program. In so doing, the DAT facility dynamically alters the end point of the existing program then executing in the sub-channel to point to the beginning of the latest translated segment.

Now, if this target operating system were to execute, through a migration facility, on a host system that uses virtual addressing but did not employ channel DAT—such as an ESA/370 or series 9000 type computer system, the target operating system would simply generate, as expected and as the need arose, additional segments of channel program. However, inasmuch as the target operating system operates under the assumption that the task of appending each such channel program segment is relegated, without more, to a channel DAT facility, the target operating system does not provide an indication, whether to the migration facility or elsewhere, whenever the original channel program changed and thus required a corresponding change in the statically translated version thereof then executing against the channel sub-system and on behalf of a sub-channel. Of course, this indication, if it were to occur, would enable the host operating system (e.g. an IBM LPAR SMAF operating system executing on an IBM 9021 computer system) to dynamically alter the channel program then executing by dynamically translating the new channel program segment, appending the newly translated segment to the existing channel program then executing and changing an end of that program to point to the beginning of this newly translated segment. However, with the absence of such an indication, the channel sub-system, on behalf of the sub-channel, in the host system finds itself executing an obsolete statically translated version of the channel program when, in fact, that program, in its virtual address form as supplied by the target operating system, was extended. Consequently, rather than reaching the beginning of a new channel program segment, as the target operating system would expect, the host channel sub-system, on behalf of the sub-channel, actually reaches the end of the obsolete statically translated channel program and terminates its current I/O operation. Thus, the target operating system is forced to restart the host channel sub-system for each successive new channel program segment which, owing to the associated processing delays and the, e.g., then current disk position, oftentimes leads to a lost disk revolution in the host system as the DASD thereon must wait for each desired record to once again come into alignment with a read/write head and thus be accessible.

Hence, as a result of emulating a target system that utilizes channel DAT on a host system that does not, the I/O device on the host system, e.g. a DASD, may produce a significantly diminished data throughput which, for certain programs that require substantial amounts of I/O transfers, can significantly reduce the overall processing throughput for the host. Disadvantageously, this, in turn, can significantly slow the host processing of the application and operating system programs that were migrated from the target system.

Therefore, we believe that a specific need exists in the art for a technique that can be used in a host computer system which does not employ channel DAT, for substantially eliminating any diminution in I/O throughput associated with emulating, on that host, a target computer system which utilizes channel DAT. Accordingly, use of such a technique should significantly lessen any performance penalty otherwise associated with executing, on the host system, application programs that require substantial amounts of I/O transfers and that were originally intended to be processed on the target system. Furthermore, we expect that incorporation of such a technique in the host system should hasten the migration of application programs from various target systems to the host system.

SUMMARY OF THE INVENTION

Through our present invention, we have advantageously overcome the deficiencies in the art by having developed a technique, based upon program controlled interrupt (PCI) chaining, for inclusion in the host operating system that enables that operating system to properly update a dynamically altering channel program in such a manner as to effectively emulate the performance of channel DAT. As such, our inventive technique substantially eliminates a need for the target operating system to re-start the host channel sub-system, on behalf of a sub-channel, to execute each new channel program segment for a common I/O operation. Consequently, our technique significantly increases the processing speed of guest application programs, that execute on the host system and particularly those which require substantial amounts of I/O transfers, and thereby removes a performance penalty, that might otherwise occur, whenever these programs were executed on the host computer system itself.

Specifically, in accordance with our present inventive teachings, a dynamically alterable channel program executing on non-channel DAT systems is updated through PCI chaining and "just-in-time" translation of each new virtual channel program segment and corresponding modification of the then executing channel program. In particular, when a PCI occurs from a sub-channel, the host operating system determines from the current channel program then being executed, a time interval that will be required to fully complete a current I/O transfer then underway through this sub-channel. Given this time interval, the host operating system then determines the latest time at which modifications to the currently executing channel program must be started in order to properly append a new channel program segment to this channel program and avoid the sub-channel terminating. The host operating system sets a timer to expire at this particular time. Once this timer expires and this time is reached, the host operating system inspects the virtual channel program provided by the guest operating system to determine if the latter has generated a new virtual channel program segment that, once dynamically translated, is to be appended to the existing channel program then executing. If the guest operating system has generated such a segment, then the host operating system appropriately dynamically translates this new channel program segment from virtual to absolute addressing and properly appends the resulting translated segment, using PCI chaining, to the existing translated channel program then executing in the channel sub-system and on behalf of the sub-channel. By utilizing a timer expiration in this fashion, the host operating system is effectively examining the virtual channel program at the last possible instant, i.e. in a "just-in-time" fashion, that will permit the successful modification of the translated version then executing in the host channel sub-system. In this fashion, the translated channel program then executing in the host channel sub-system, and on behalf of the sub-channel, will accurately reflect the virtual channel program then being supplied by the target operating system and be dynamically extended as envisioned by the target operating system. By timing the host channel program translation and modification operations to occur in this fashion, a single channel I/O operation can be successfully dynamically extended over as many channel program segments as are required by the guest operating system.

Furthermore, in accordance with our inventive teachings, if the first CCW in the translated channel program will not cause a sub-channel to generate a PCI, then, the host operating system modifies this CCW (by, e.g., setting an appropriate PCI flag therein) to generate such an interrupt. However, the host operating system will reflect only those PCIs back to the guest operating system that the latter had originally requested in the virtual channel program. As a result, channel programs, particularly relatively long running channel programs and the underlying guest application programs, will execute much faster than if the virtual channel program originally generated by the guest operating system were translated into a real address mode and simply executed in the sub-channel without such modifications.

BRIEF DESCRIPTION OF THE DRAWINGS

The teachings of the present invention can be readily understood by considering the following detailed description in conjunction with the accompanying drawings, in which:

FIG. 6 depicts a simplified high level hierarchical block diagram of the software executing within (host) system 10, shown in FIG. 1 for executing a guest operating system and associated applications on system 10, wherein the guest operating system relies on the use of channel dynamic address translation (DAT) which is a feature not provided on system 10;

FIG. 7 depicts the correct alignment of the drawing sheets for FIGS. 7A and 7B;

FIGS. 7A and 7B collectively depict a high level flowchart of Host Operating System Channel Control routine 700 that is used in implementing our present invention;

FIG. 8 depicts the correct alignment of the drawing sheets for FIGS. 8A and 8B;

FIGS. 8A and 8B collectively depict a high level flowchart of Host PCI Service routine 800 that is executed within routine 700 shown in FIGS. 7A and 7B;

FIG. 9 depicts a high level flowchart of Host Timer "Pop" Service routine 900 that is also executed within routine 700 shown in FIGS. 7A and 7B;

FIG. 10 depicts a high level flowchart of Host Sub-channel Terminate routine 1000 that is also executed within routine 700 shown in FIGS. 7A and 7B;

FIG. 12 diagrammatically depicts I/O information flow between guest and host operating systems and accompanying operations, which both occur on system 10 and would result from use of our invention whenever a dynamic modification of a channel program would be too slow relative to an I/O transfer through an associated sub-channel.

To facilitate understanding, identical reference numerals have been used, where possible, to designate identical elements that are common to various figures.

DETAILED DESCRIPTION

After considering the following description, those skilled in the art will clearly realize that the teachings of our invention can be readily utilized in a wide variety of different computer systems, that rely on virtual addressing but do not incorporate dynamic address translation (DAT) in a channel sub-system, to update dynamically alterable channel programs and provide virtual address translation in a manner that emulates channel DAT. For purposes of illustration and to simplify the following discussion, we will discuss our invention in the context of use with a ESA/370 or series 9000 type computer that is manufactured by International Business Machines Corporation (IBM) which is also the present assignee hereof.

Figure 1:
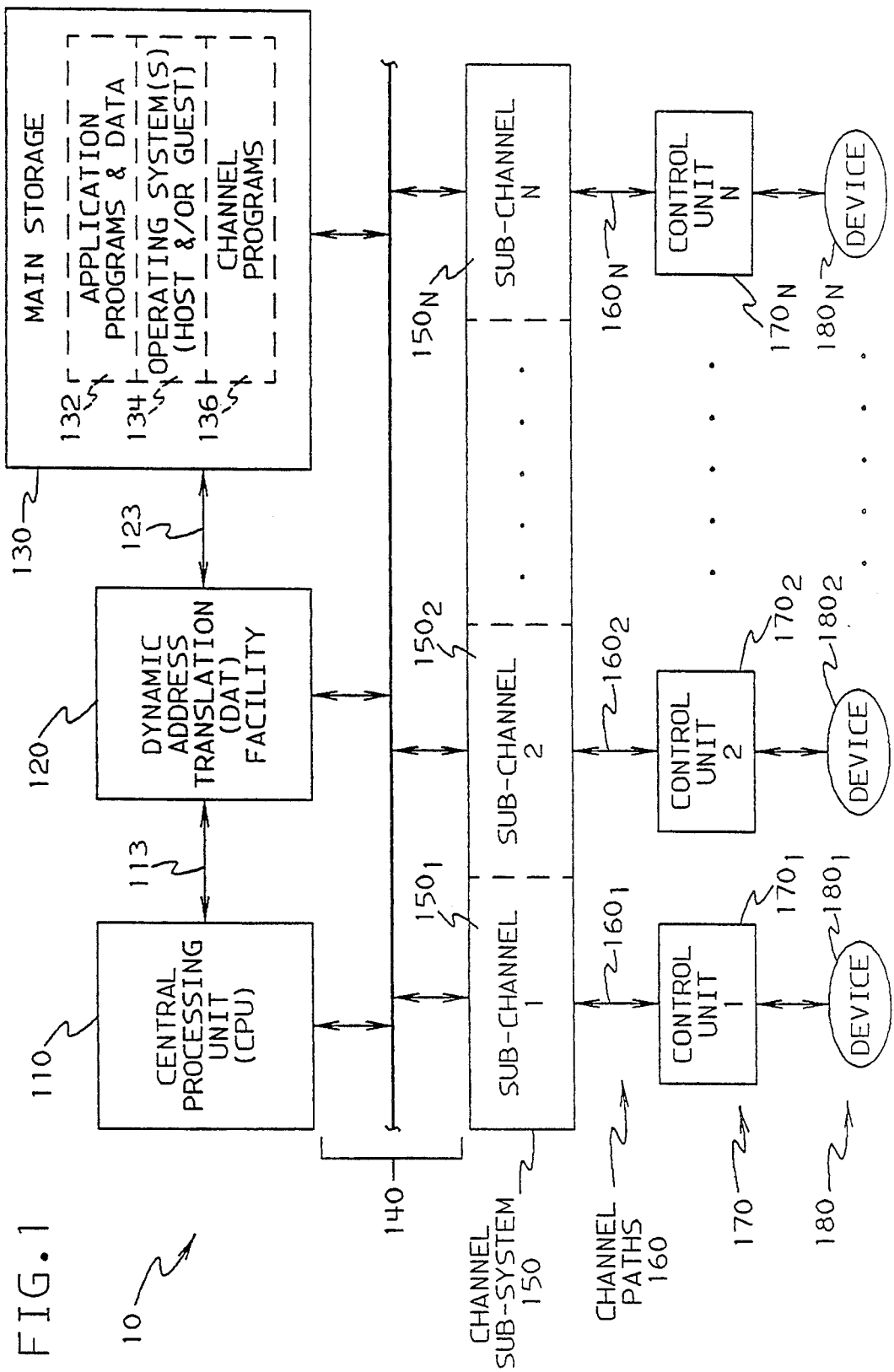
FIG. 1 depicts a high level block diagram of computer system 10 that can incorporate the teachings of the present invention.

FIG. 1 depicts a high level simplified illustrative block diagram of computer system 10 that can incorporate the teachings of the present invention.

As shown, this system contains central processing unit 110, dynamic address translation (DAT) facility 120, and main storage 130, all of which are inter-connected through bus 140 to channel sub-system 150 and therethrough, via channel paths 160, to control units 170 and input/output (I/O) devices 180. In essence, main storage 130, which is formed of high speed random access memory, stores application programs and accompanying data 132, operating systems 134 (which, as will be seen below may consist of both host and guest operating systems) and channel programs 136. Each memory location within main storage 130 has both an absolute address and a corresponding real address. Central processing unit (CPU) 110, to the extent relevant here, executes instructions temporarily residing within main storage 130. In most modern computers, such as the ESA/370 or series 9000 computer systems, the CPU utilizes virtual addresses. Virtual addresses can not be used to directly access memory locations within main storage 130. Consequently, prior to executing a program, DAT facility 120 is utilized by the operating system (specifically a "host" operating system), to translate all the addresses in that program from virtual to real mode addresses. Thereafter, at the time of addressing a particular memory location, the DAT facility through simple prefixing, converts the real address for that location into an absolute address which is then used to directly address this location in the main storage. The CPU is interconnected, via link 113, to DAT facility 120, which, in turn, is interconnected, via link 123, to main storage 130.

To transfer information to or from an I/O device, and CPU 110, DAT facility 120 and main storage 130, these three system components are also interconnected, via bus 140, to channel sub-system 150. This sub-system contains separate sub-channels $150_1$, $150_2$, ..., $150_n$, each of which is connected through a corresponding channel path $160_1$, $160_2$, ..., $160_n$ (which collectively form channel paths 160) to a control unit associated with each separate I/O device. As shown, sub-channels $150_1$, $150_2$, ..., $150_n$ are connected through respective channel paths $160_1$, $160_2$, ..., $160_n$ through corresponding control units $170_1$, $170_2$, ..., $170_n$, to associated I/O devices $180_1$, $180_2$, ..., $180_n$. Each of the I/O devices may consist of illustratively a direct access storage device (DASD) (hard disk drive), a tape drive, a keyboard, a printer, a display or a communications controller. To transfer information involving a particular I/O device, such as device $180_1$, in an efficient manner, CPU 110 loads a so-called channel program, formed of a sequence of channel command words (CCWs), from main storage 130 into the channel sub-system and on behalf of a corresponding sub-channel, e.g. sub-channel $150_1$, situated within the channel sub-system and then instructs the channel sub-system, and on behalf of this sub-channel, to execute this program. The channel program then assumes total control over the transfer of information involving that I/O device, thereby freeing the CPU to process other tasks pending the completion of the transfer. The channel program is fabricated by an operating system then executing on system 10.

Each control unit provides the logical capabilities necessary to operate and control its associated I/O device and permit that device to respond to standard CCWs. Specifically, the control unit controls the timing of data transfer over a channel path and provides various indications concerning the status of device. In this regard, the control unit for a particular device decodes CCWs received from the corresponding sub-channel, interprets each of these CCWs for this device and generates necessary signal sequences to the device which are required to execute a desired I/O operation thereon.

Figure 2:
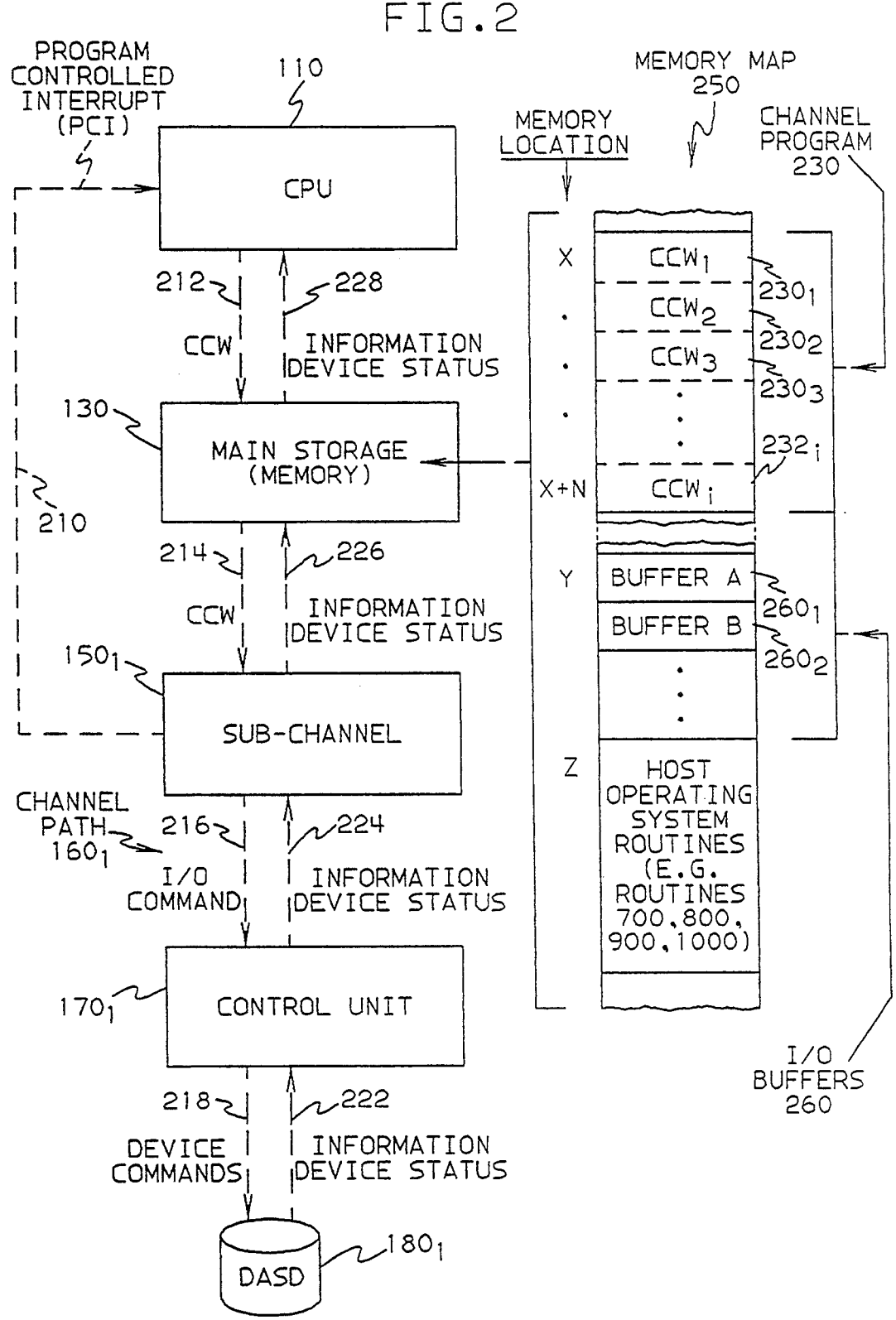
FIG. 2 depicts a simplified high level block diagram of system 10, shown in FIG. 1, and specifically a single I/O sub-channel and device connection utilized within this system, along with associated partial memory map 250.

With the above in mind, FIG. 2 depicts a simplified high level block diagram of system 10 and the associated system components that effectuate an I/O transfer involving device $180_1$, this device being illustratively shown as a DASD. To effectuate an I/O transfer from this device, CPU 110, under the control of an operating system, fabricates a channel program that contains a sequence of CCWs. Each of the CCWs specifies a particular command to be executed, and for a command that initiates a certain I/O operation, designates an area in main storage associated with that operation (i.e. an area to be written into or read from) and an action to be taken whenever the transfer to or from this area is completed, as well as other options. The format of an illustrative CCW is discussed below in conjunction with FIG. 3.

Each channel program is stored within memory 130. Upon issuance of a start sub-channel (SSCH) command (which defines the location in main storage 130 of the first CCW in the channel program) by CPU 110 to the channel sub-system, the channel sub-system, on behalf of, e.g., sub-channel $150_1$, accesses the channel program from the main storage and fetches and executes each CCW therein in seriatim. For each CCW in the channel program that requires a response from DASD $180_1$, sub-channel $150_1$ issues an appropriate I/O command, over channel path $160_1$ to control unit $170_1$. In response to this command, the control unit generates device commands appropriate to DASD $180_1$ to effectuate the desired response. Thus, as shown by dashed lines 212, 214, 216 and 218, CCWs originate from CPU 110, are fetched from main storage 130, via the channel sub-system, routed to sub-channel $150_1$ and eventually result in appropriate device commands being issued from control unit $170_1$ to DASD device $180_1$, with, for a device read operation, transferred information and status illustratively proceeding from the DASD to the CPU in a reverse direction, as indicated by corresponding lines 222, 224, 226 and 228.

Inasmuch as DASD $180_1$ (as with other I/O devices, such as a tape drive) operates on a sequential rather than a random access basis, the channel program tends to operate in synchronism with a current position of this device in order reduce device latency and hence maximize the data transfer rate involving this device. In that regard and as will be discussed in greater detail below, if a channel program is initiated to transfer (e.g. write to or read from) a record on a track on DASD $180_1$, the likelihood exists that the accompanying application program, which required this record, will likely need to transfer information for the next successive record on the same track, and possibly other such successive records on the same track. Therefore, since a disk storing these records on DASD $180_1$ is continuously rotating, then, ideally speaking, to maximize data transfer, each successive record should be transferred immediately after the prior record on the same track and as that successive record appears under a corresponding read/write head. If, however, the channel program is unable to execute when the desired record first appears under the head, then the channel program must wait, for the data transfer to occur, until the disk rotates through nearly a full revolution to a point at which this record once again appears under the head. Accordingly, no information transfer occurs during this disk rotation. As such, disk rotation time is a critical factor in total I/O time.

Furthermore, a considerably larger amount of CPU processing time is consumed if a channel program terminates and then needs to be re-started in order to access a particular record rather than continuing an on-going I/O operation. In this regard, each time a new disk I/O operation is initiated, that operation must start with a search and seek operation to ensure that an arm which positions the head is correctly positioned and the head is properly oriented. As such, whenever the disk rotates at the conclusion of an I/O operation to a position where the head is over the next record, then owing to the continuous rotation of the disk, the extra time required to initiate a new I/O operation for the next record ensures that the opportunity to continue and transfer the next record during the present disk revolution is essentially lost. Hence, if each record is transferred in a completely separate I/O operation, then one or more disk revolutions would be required to handle each of these records. Accordingly, this additional I/O transfer time would greatly slow execution of the associated application program that requires the transfer.

Therefore, in an attempt to maximize data transfer time by maintaining synchronous operation between DASD 1801 and the channel sub-system, and particularly the sub-channel therein, during the course of a data transfer involving successive records on a common track while simultaneously avoiding a need to restart a channel program to transfer all of these records in seriatim, it is well known in the art to dynamically alter the channel program. In this regard, CPU 110, under control of an operating system, dynamically extends a channel program then being executed such that an additional CCW is appended, through so-called command chaining, to the end of that program prior to a point in time at which the channel program would terminate. Specifically, the end of the executing channel program would be altered to point to the latest CCW then being appended, and so forth for successively appended CCWs. In this manner, if the channel program is altered in sufficient time, i.e. sufficiently before a current record is fully transferred and underlying channel program terminates, then once that transfer completes, the channel sub-system, on behalf of the sub-channel, will execute the new CCW to transfer the next successive record on the same track and during the same channel I/O operation but without requiring the channel program to terminate and re-start—hence, a single I/O operation will be used to transfer dynamically increasing amounts of information than originally intended. Inasmuch as relatively large amounts of time can be consumed in tape shut-down and start-up sequences, a need for similar synchronous operation with dynamically altered channel programs and extended I/O transfers exists if the I/O device is a tape drive or other relatively slow electro-mechanical I/O device.

Dynamic alteration of channel programs can be conventionally conducted through use of a program controlled interrupt (PCI) in conjunction with use of separate I/O buffers to effectuate so-called "PCI chaining". A program controlled interrupt, which is a feature in the OS/MVT and MVS/370 operating systems produced by IBM, is an interrupt which, in conjunction with a CCW, is triggered by the sub-channel whenever the channel sub-system, on behalf of the sub-channel, reaches a corresponding CCW. This particular CCW is one in which its so-called "PCI flag" as described below in conjunction with FIG. 3, has been set. When a CCW is reached in which the flag is set, the sub-channel merely generates an interrupt (the so-called PCI interrupt) to the CPU. The PCI interrupt is illustratively represented by dashed line 210. By strategically setting this interrupt to occur within a channel program, the CPU can readily determine the current activity of this program by noting and responding to the subsequent occurrence of the PCI interrupt. Through judicious use of the PCI, as described below, channel programs may be dynamically altered; though depending upon the length of an on-going I/O transfer, this alteration may not always succeed.

In particular, to dynamically alter a channel program, I/O transfers are conducted through a number of separate I/O buffers, illustratively I/O buffers 260, which contain buffers A and B also denoted as buffers $260_1$ and $260_2$, located in main storage 130. Owing to the need to synchronize the operation of sub-channel $150_1$ to DASD $180_1$, as one record, e.g. a first record, is being transferred by the channel sub-system between the DASD and one of the I/O buffers, e.g. Buffer A, CPU 110 prepares information, specifically a channel program, for a next successive record, e.g. a second record, in another one of these buffers, e.g. Buffer B, for subsequent transfer to the DASD once the present transfer in progress completes. At the conclusion of the transfer for the first record, the sub-system switches to Buffer B and utilizes it to transfer the second record. In the meantime, the CPU can prepare information, i.e. another channel program, within Buffer A, or any of the buffers other than Buffer B, for use in transferring a third record, and so forth for successive records. In this manner, the CPU and the sub-system (and hence the sub-channel) operate in parallel such that the particular buffer that the sub-channel will use to transfer a given record has been fully prepared by the CPU and is ready to handle that transfer once an immediately prior transfer, involving another buffer, is complete.

By setting the PCI flag in a CCW that is situated in one of the I/O buffers, the CPU will know from the occurrence of the resulting interrupt when an immediately prior transfer involving another of these buffers has completed and hence the CPU can re-use that latter buffer. In this regard, if a single channel program contained two CCWs: a first CCW in Buffer A followed by a second CCW in Buffer B, then if the PCI flag were set in the second CCW, the resulting PCI interrupt generated by sub-channel $150_1$ to CPU 110, in response to the second CCW, would serve as a signal to the CPU as to when the transfer involving Buffer A was complete and hence when Buffer A could be re-used for a third CCW, and so forth for PCIs generated by subsequent CCWs. Thus, each PCI serves as a signal indicating the status of corresponding buffers and information transfer.

While any number of I/O buffers can be used in conjunction with dynamically alterable channel programs, in a worst case scenario only two such buffers are employed to conserve memory space. For that reason, we will consider only two such buffers from here on; though those skilled in the art will clearly recognize that our inventive teachings, set forth below, can function with any number of I/O buffers.

Once a PCI interrupt occurs, the CPU can fabricate the next successive CCW and through "command chaining" append that successive CCW, to transfer a successive record, onto the current channel program then being executed. The successive CCW merely defines a new storage area in main storage for the current I/O operation then underway. Through command chaining, when the last byte of data transfer has been placed into the main storage, then the successive CCW takes control of the current I/O operation. In this manner, the current I/O operation is dynamically extended to encompass a transfer of this successive record, and so forth for successive CCWs that are to further extend this operation. Command chaining is effectuated by setting a "chain command" flag, as discussed in detail below, in each CCW that is being appended. As will be discussed in conjunction with FIG. 4 below, dynamic alteration of channel programs through "PCI chaining" succeeds only in those instances where the CPU can keep ahead of the sub-channel, i.e. where the CPU can completely re-build the appropriate buffer and fully modify the executing channel program sufficiently prior to the time at which the I/O device, here DASD $180_1$, completes the current I/O operation. However, in those instances, where the device completes its current transfer prior to conclusion of these modifications, hence generating a device end (DE) indication to the sub-channel which, in turn, generates a channel end (CE) indication, then the channel program simply terminates, thereby forcing the CPU to re-start both the channel program and the t/O operation. Nevertheless, where dynamic channel program alteration through PCI chaining does function, these alterations yield significant reductions in overall application processing time. For example, applications which completed in, e.g., 5 minutes through use of these alterations, may require, e.g., 15–20 minutes to complete without use of such channel program alterations. Consequently, in executing applications programs, such as payroll processing, airline reservation processing and the like, that require substantial amounts of I/O transfers, dynamically altering channel programs through PCI chaining could markedly improve sub-channel performance and vastly increase overall execution speed.

FIG. 2 also depicts partial memory map 250. As depicted, main storage (memory) 130 is formed of a series of sequential storage locations, of which a small illustrative portion is depicted in map 250. As depicted, main storage 130 contains channel program 230, which itself consists of: successive CCWs $230_1$, $230_2$, $230_3$, . . . $230_i$ situated at corresponding storage locations x, . . . , x+n; I/O buffers 260, which illustratively contain Buffers $260_1$ (Buffer A), $260_2$ (Buffer B), . . . starting at memory location y; and starting at location z, host operating system routines, such as illustratively routines 700, 800, 900 and 1000 which are used to implement the present invention. Although the host operating system contains a substantial number of routines, for the sake of simplicity, all of those routines that are not used to implement the present invention have been omitted from map 250.

Figure 3:
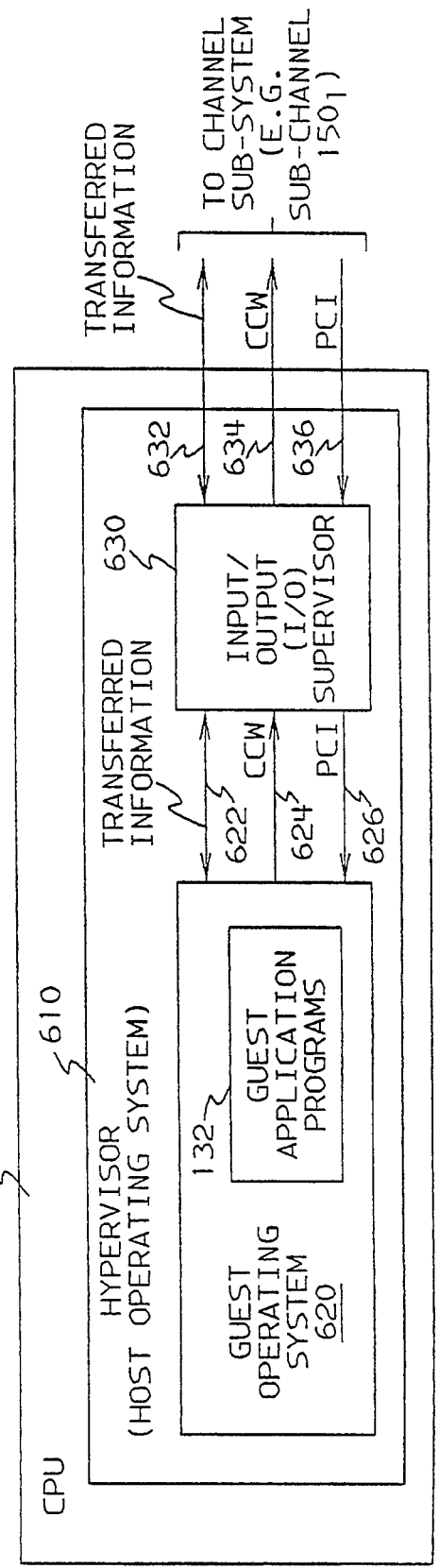
FIG. 3 depicts an illustrative format, i.e. the constituent fields, of a channel command word (ccw)

FIG. 3 depicts an illustrative format of a channel command word (CCW). Although a CCW can possess somewhat differing formats, the differences only concern the placement of constituent fields within the CCW. Moreover, CCWs can utilize either direct or indirect addressing. The differences in addressing merely concern whether the CCW contains a real memory address (direct addressing) or a pointer to a specific location in a list (of so-called Indirect Data Address Words—IDAWs) containing an absolute memory address (indirect addressing). Inasmuch as all these differences are also immaterial to the present invention, for the sake of simplicity, these differences will be ignored, and CCW 300 will be taken as an illustrative direct addressing CCW.

As depicted, CCW 300 is formed of two successive 32-bit words 310 and 320 (also respectively denoted as word 1 and word 2). Word 310 is formed of three basic fields, eight-bit command code field 312, eight-bit flag field 314 and fifteen-bit count field 318. Command code field 312 contains an opcode which specifies a particular instruction that a channel sub-system, on behalf of a sub-channel, is to execute. For the ESA/370 type computers, these instructions are typified by read, write, read backward, control, sense, sense ID and transfer-in-channel (TIC). Flag field 314 contains various flags that can be set or reset to provide certain desired responses from a sub-channel. To the extent relevant here, field 314 contains CC (command chain) flag 313 and PCI flag 315 located at bit positions 9 and 13, respectively. Whenever the CC flag is set in a CCW, the sub-channel interprets this CCW as being command chained to the immediately prior CCW in the channel program; thereby executing a new command but involving the same area in main storage that was used for the former CCW during the present I/O operation. Whenever the PCI flag in a CCW is set, the sub-channel will generate a PCI to the CPU when this CCW begins executing. Count field 318 specifies a count of remaining consecutive bytes to be transferred during execution of this CCW. Word 2 contains a single 31-bit data address field 326. This address field contains an absolute address of the physical location in the main storage of the first byte to be transferred through execution of this CCW. For CCWs that invoke read, write, control and sense-ID operations, successive locations in the main storage are used in ascending, i.e. "forward" order (CCWs that invoke other operations may utilize descending or "backward" addressing). Accordingly, as information is successively transferred for each of these operations, in byte-wise and ascending fashion, to or from main storage, the address from data address field 326 in the associated CCW is successively incremented and the value then existing in count field 318 is successively decremented for each such successive byte. When the value of count field 318 reaches zero, the storage area defined by the CCW is exhausted and the associated data transfer operation is completed.

Figure 4:
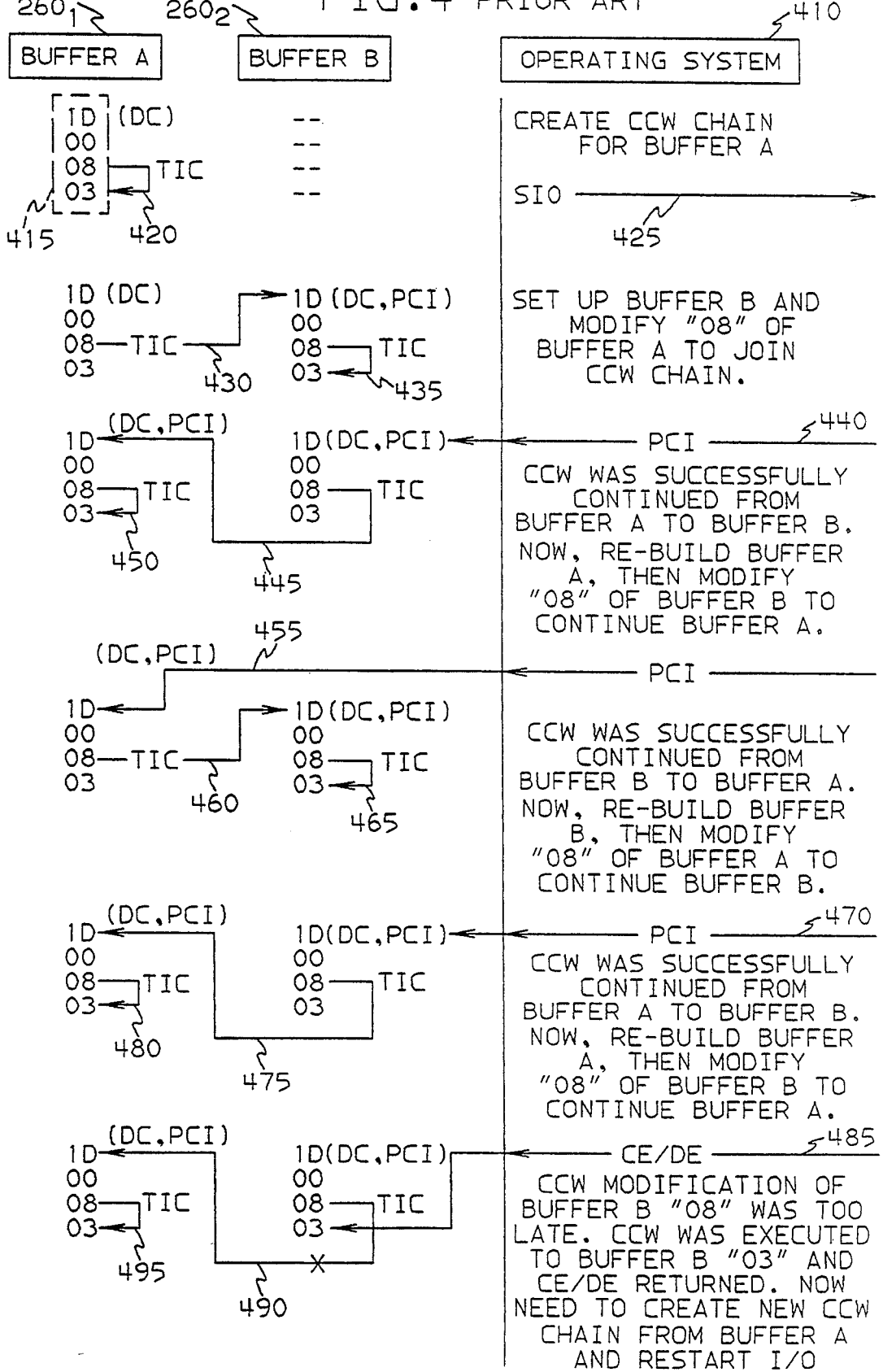
FIG. 4 diagrammatically shows updating and chaining operations and accompanying contents, as a function of various events, of two I/O buffers, that collectively contain a channel program that is being dynamically updated using program controlled interrupt (PCI) chaining, as is known in the art.

With all the above in mind, FIG. 4 diagrammatically shows a conventional manner through which an illustrative dynamically altering channel program is being updated through PCI chaining. Here, the channel program being executed is shown in dashed block 415 and consists of four CCWs. To simplify the figure, only the opcodes associated with each of these CCWs is specifically shown. As constituted, the channel program is formed of a write operation (opcode "1D") that has been data chained to the next CCW (opcode "00"), followed by a transfer-in-channel operation (opcode "08"), and finally a No-op (no operation) CCW (opcode "03"). A transfer-in-channel (TIC) CCW does not initiate an I/O operation but merely provides a branch operation to provide chaining (either data or command) between CCWs located in non-adjacent double-word locations in the channel program. Within this channel program, the first and second CCWs are data chained together (as indicated by "DC"); while the second, third and fourth CCWs are command chained together (not explicitly indicated). The discussion will first illustrate the desired synchronous operation of the sub-channel and the operating system, followed by an illustration of events that occur when the sub-channel completes an I/O operation prior to the channel program being fully modified.

Prior to the start of the channel program, the operating system on the CPU has created the channel program in Buffer A ($260_1$). As created, the TIC merely points, as symbolized by line 420, to the No-op CCW which is situated at the end of the program. Once this program is created and is to be executed by the channel sub-system, on behalf of the sub-channel, the operating system issues, as symbolized by line 425, the start I/O (SIO) instruction to the sub-system. Now, once this program is executing through Buffer A, the operating system builds a channel program segment in Buffer B ($260_2$) and sets the PCI flag in the first CCW in the channel program. Moreover, as the last operation in modifying a channel program, the TIC CCW in Buffer A is changed, as represented by line 430, to point to the first CCW of the channel program segment in Buffer B rather than the ending CCW in Buffer A, thereby appending the channel program segment in Buffer B onto the program presently executing in Buffer A. Inasmuch as an I/O operation generally involves the transfer of successive records into or from a common dataset, the same basic channel program segments are built in both buffers—though the absolute addresses in the address fields of the CCWs in both programs will be different in order to transfer successive records from the DASD into different areas within the main storage.

In any event, assuming the channel program segment in Buffer B was built and the modifications to the channel program then executing in Buffer A were all completed sufficiently prior to the completion of the channel program in the latter buffer, then the sub-channel will generate a PCI as represented by line 440. As shown, upon completion of the channel program in Buffer A, the PCI will signify that the sub-system, on behalf of the sub-channel, successfully continued the channel program for a new I/O transfer from that in Buffer A to the channel program segment in Buffer B. Accordingly, the sub-system will simply execute the channel program segment in Buffer B without terminating the present I/O operation in progress. Simultaneously therewith, the CPU will re-build what is now a channel program segment in Buffer A by appropriately modifying the CCWs, specifically the addresses therein, and changing the TIC CCW in Buffer B to point to the beginning of the channel program segment in Buffer A—the latter operation being symbolized by line 445. Furthermore, to provide an indication as to when the channel program segment in Buffer A begins executing, the operating system will set the PCI flag of the first CCW (opcode "1D") in Buffer A in order to subsequently generate a PCI. The TIC CCW in Buffer A will then point, as symbolized by line 450, to the conclusion of what is now a latest segment of the channel program, i.e. the No-op CCW situated as the last CCW in Buffer A. All the while, the sub-system, on behalf of the sub-channel, continues executing the channel program segment situated in Buffer B. Thus, as one can readily see, the operation of Buffers A and B reverses at the beginning of each successive channel program segment and hence for each successive I/O transfer.

Once the channel sub-system reaches the end of the channel program segment in Buffer B, as indicated by the occurrence of a PCI, symbolized by line 455 and associated with the start of the channel program segment situated in Buffer A, the operating system will suitably re-build the channel program segment situated in Buffer B and modify the TIC CCW for the channel program segment then executing through Buffer A to point, as symbolized by line 460, to the first CCW in Buffer B. The TIC CCW in Buffer B, will point, as symbolized by line 465, to what now becomes the end of the entire channel program.

Now, when the next PCI occurs, as symbolized by line 470, the operating system is notified that the channel program was successfully continued from Buffer A to Buffer B. As such, the channel sub-system, on behalf of the sub-channel, will execute the channel program in Buffer B, while the operating system will re-build the channel program segment situated in Buffer A. Again, to properly extend the channel program, the TIC CCW in the channel program segment then executing in Buffer B will be modified to point, as symbolized by line 475, to the first CCW in Buffer A. Now, the TIC CCW in Buffer A will point, as symbolized by line 480, to the new end of the channel program, and so on for each successive new segment appended to the channel program.

However, in the event that the modifications could not be completed by the time the sub-channel completes an I/O transfer, then the channel sub-system, on behalf of the sub-channel, will return, as symbolized by line 485, a "CE/DE" (channel end/device end) indication. This signifies that the device has terminated its current I/O operation as has the sub-channel. Assume, for illustrative purposes, that the sub-channel is executing a channel program segment situated in Buffer B. Hence, in this instance and at this point in time, since the operating system has not yet changed the TIC CCW in Buffer B, as symbolized by line 490 having an "X" therethrough, to point to the start of a next channel program segment situated in Buffer A, then, rather than continuing to the channel program segment in Buffer A to its end (as symbolized by line 495), the sub-channel will instead execute down to the No-op CCW (opcode "03") in the channel program segment in Buffer B. Once this particular CCW is executed, the sub-channel will simply terminate. At that point, the operating system will need to re-create the channel program and re-start the sub-channel and the underlying I/O operation—which, in turn, will likely engender a lost disk revolution and hence, an increase in latency of the DASD with a concomitant slowing of application processing.

Figure 5:
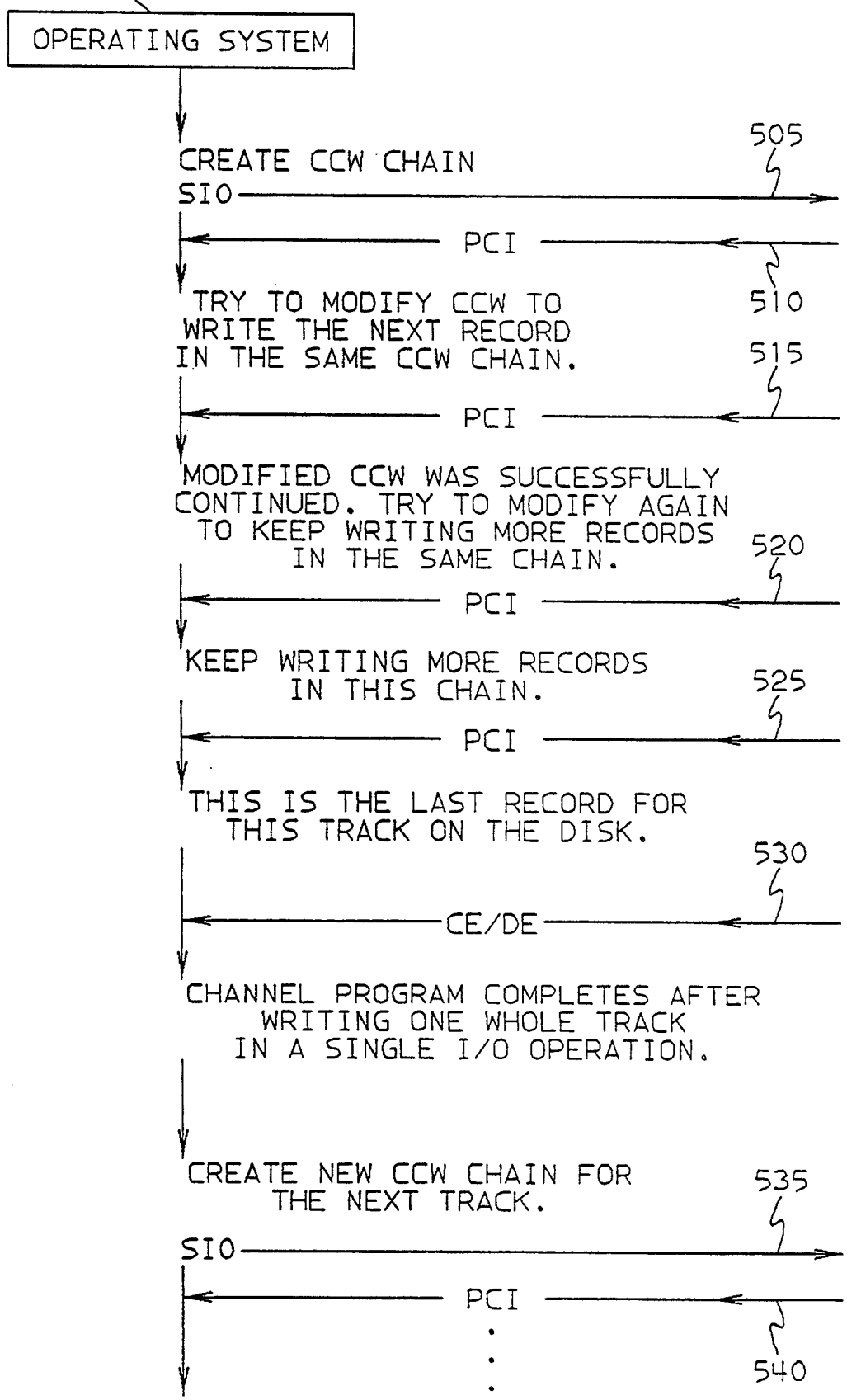
FIG. 5 diagrammatically shows I/O flow of an operating system that is dynamically updating a channel program using PCI chaining, as is known in the art and in accordance with that shown in FIG. 4.

FIG. 5 diagrammatically shows I/O flow of the operating system for a dynamically altering channel program that is being updated through PCI chaining in accordance with that shown in FIG. 4. This program undertakes a disk format write operation.

As shown, operating system 410 first creates the channel program (CCW chain). At the appropriate time after this occurs, the operating system issues a start I/O instruction, as symbolized by line 505, to the channel sub-system, on behalf of the sub-channel, to initiate execution of the channel program. Thereafter, at the occurrence of a PCI, as symbolized by line 510, the operating system attempts to modify the channel program, specifically one or more CCWs, to write the next record in the same CCW chain. If this modification was successfully completed in time, then later a PCI will occur, as symbolized by line 515. The occurrence of this PCI signifies that the modified channel program was successfully continued. As such, the operating system will attempt to successively modify the channel program again to write each additional desired record through the same, though successively extended, channel program at the occurrence of corresponding PCIs, such as that symbolized by line 520. Eventually, a PCI, symbolized by line 525 will occur, which will signify the start of the last channel program segment, i.e. that which will transfer the last desired record. Once this particular channel program segment concludes, the operating system will receive a CE/DE indication, as symbolized by line 530, from the sub-channel. Once this indication is received, the sub-channel will terminate its current I/O operation once the current track is either completely written. Format disk write operations generally require that once a channel program ends with a current record, the remainder of the current track situated after that record must be padded. Thereafter, to transfer information from the DASD, the operating system must create a new channel program, and re-start the sub-channel by issuance of an SIO command in order to initiate a new I/O operation, and so forth as symbolized by line 535, and subsequently modify that channel program, in response to subsequent PCIs, as symbolized by line 540, and so on.

Generally speaking, idiosyncrasies associated with channel programs and address translation remain completely transparent to users who upgrade from one computer system to a larger computer system within a common family of computers provided by one manufacturer. However, users not only upgrade from one such system to the next, but also migrate, both application and operating systems, from a "target" system produced by one manufacturer, on which these programs were originally intended to be executed, to a different computer system, i.e. a "host" system, produced by a different manufacturer, with the latter being typified by a system based on the ESA/370 or series 9000 architecture.

In this regard, FIG. 6 depicts a simplified high level hierarchical software block diagram of a non-channel DAT host system that emulates a target system that utilizes channel DAT. As depicted, the host system executes host operating system 610, such as an LPAR SMAF operating system provided by IBM, on CPU 110. Inasmuch as this particular operating system directly controls the hardware associated with the host system as well as target (also referred to herein as a "guest") operating system 620 which also executes on the host system, host operating system 610 can be viewed as a "hypervisor". This hypervisor contains well known I/O Supervisor 630 which provides an interface to the channel sub-system and controls I/O transfers between the guest operating system and the channel sub-system, including illustratively sub-channel 150₁. In operation, I/O Supervisor 630 obtains a channel program from guest operating system 620, which reflects desired I/O transfers required by guest application programs 132, and, as symbolized by lines 624 and 634, routes that channel program to the host channel sub-system for execution thereunder. Information is then transferred, as symbolized by lines 622 and 632, through I/0 Supervisor 630, between guest operating system 620 and the channel sub-system. The resulting PCIs, if any, that are generated by the channel sub-system (and illustratively over sub-channel 150₁) are reflected back, as symbolized by lines 636 and 626, through the I/O Supervisor to the guest operating system.

Unfortunately, in situations where the target system provides channel DAT but the host system does not, the resulting performance of the migrated programs (both the guest application and operating system) is often compromised. In this regard, if channel programs intended for execution on a channel DAT system are instead executed on a non-channel DAT host system, a significant reduction in processing throughput, particularly for target application programs that require substantial amounts of I/O, may disadvantageously result.

Specifically and in contrast to that described thusfar, in a computer system that utilizes channel DAT, as the channel program is executed by the channel sub-system, all addresses (both the addresses of the CCWs themselves and the addresses contained in the CCWs and used to access storage areas) are translated dynamically by the channel sub-system as it fetches CCWs and moves information to and from main storage. As with most programs, this channel program contains a beginning point and an end point. With channel DAT, as each new segment of channel program is built, by a target operating system executing on the CPU, that segment is simply supplied to a channel DAT facility (not specifically shown). In response, this facility first translates that section and then appends a resulting translated section onto the existing channel program. In doing so, the DAT facility dynamically alters the end point of the existing program then executing in the channel sub-system, on behalf of a sub-channel, to point to the beginning of the latest translated section.

Now, if this target operating system were to execute, through a migration facility, on a host system that uses virtual addressing but did not employ channel DAT, the target operating system would simply generate, as expected and as the need arose and in the manner described above, additional segments of channel program. However, inasmuch as the target operating system operates under the assumption that the task of appending each such segment is relegated, without more, to a channel DAT facility and not to another operating system, the target operating system would not provide an indication, whether to the migration facility or elsewhere, whenever the original channel program changed and thus required a corresponding change in the statically translated version thereof then executing against the channel sub-system and particularly on behalf of the sub-channel. Of course, this indication, if it were to occur, would serve as a signal to the host operating system (e.g. an IBM LPAR SMAF operating system executing on an IBM 9021 computer system) to dynamically alter the channel program then executing by dynamically translating the new channel program segment, appending the newly translated segment to the existing channel program then executing and changing an end of that program to point to the beginning of this translated segment. However, with the absence of such an indication, the channel sub-system in the host computer system, and particularly on behalf of a sub-channel, finds itself executing an obsolete statically translated version of the channel program when, in fact, that program, in its virtual address form as supplied by the target operating system, was extended. Consequently, rather than reaching the beginning of a new channel program segment, as the target operating system would expect, the host sub-system actually reaches the end of the obsolete statically translated channel program and terminates its current I/O operation. Thus, the target operating system is forced to completely restart the host channel sub-system to execute each successive new channel program segment which, owing to the associated sub-channel processing delays oftentimes leads to a lost disk revolution in the host system as the DASD thereon must wait for each successive desired record to once again come into alignment with a read/write head and thus be accessible.

Advantageously, and in accordance with our inventive teachings, we have developed a technique for inclusion in the host operating system that enables that operating system to properly update a dynamically altering channel program in such a manner as to effectively emulate the performance of channel DAT. As such, our inventive technique substantially eliminates a need for the target operating system to re-start the host channel sub-system, on behalf of a sub-channel, to execute each new channel program segment for a common I/O operation. Consequently, our technique significantly increases the processing speed of guest application programs, that execute on the host system and particularly those which require substantial amounts of I/O transfers, and thereby removes a performance penalty, that might otherwise occur, whenever these programs were executed on the host computer system itself.

Specifically, in accordance with our present invention, whenever a PCI occurs from the channel sub-system, the host operating system determines from the current channel program then being executed, the time interval that will be required to fully complete a current I/O transfer then underway through a sub-channel. Given this time interval, the host operating system then determines the latest time at which modifications to the current executing channel program must be started in order to properly append a new channel program segment to the currently executing channel program without the sub-channel terminating. The host operating system sets a timer to expire at this particular time. Once this timer expires and this time is reached, the host operating system inspects the virtual channel program provided by the guest operating system to determine if the latter has generated a new virtual channel program segment that, once translated, is to be appended to the existing channel program then executing. If the guest operating system has generated such a segment, then the host operating system appropriately dynamically translates this new segment from virtual to absolute addressing and properly appends the resulting translated channel program segment using PCI chaining to the existing translated channel program then executing in the channel sub-system and on behalf of the sub-channel. By utilizing a timer expiration in this fashion, the host operating system is effectively examining the virtual channel program at the last possible instant, i.e. in a "just-in-time" fashion, that will permit the successful modification of the translated version then executing in the host channel sub-system and on behalf of this host sub-channel. In this fashion, the translated channel program then executing in the host sub-channel will accurately reflect the virtual channel program then being supplied by the target operating system and be dynamically extended as envisioned by the target operating system. By timing the host channel program translation and modification operations to occur in this fashion, a single channel I/O operation can be successfully dynamically extended over as many channel program segments as are required by the guest operating system.

We will now describe the software routines, for inclusion and execution within the host operating system (hypervisor), that implement our present invention. This software consists of Host Operating System Channel Control routine 700, Host PCI Service routine 800, Host Timer "Pop" Service routine 900 and Host Sub-channel Terminate routine 1000—all of which will be discussed in detail below. While these routines would be separately executed by the hypervisor for each different sub-channel then in use in order to provide proper updating of the channel program then executing in the channel sub-system and on behalf of each such sub-channel, to simplify the following discussion these routines will be discussed in the context of use with only a single sub-channel.

Figure 7B:
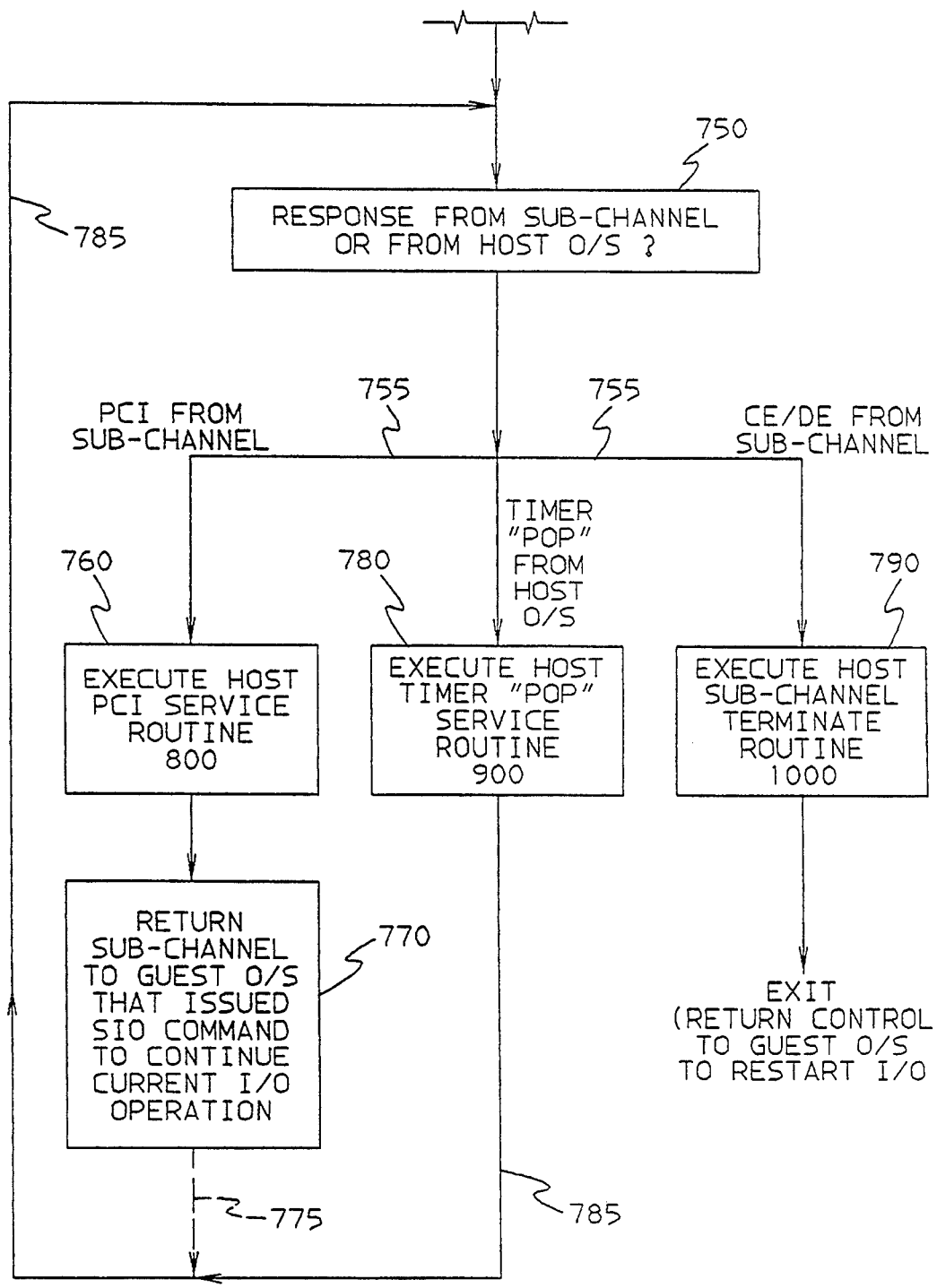

A high level flowchart of Host Operating System Channel Control routine 700 that is used in implementing our present invention is collectively depicted in FIGS. 7A and 7B, for which the correct alignment of these drawing sheets is shown in FIG. 7. Routine 700, by executing routines 800, 900 and 1000 at appropriate times, collectively provides the operations in the host operating system to properly update a dynamically altering virtual channel program.

Specifically, routine 700 is executed whenever a guest operating system generates a start I/O (SIO) command. At this point, the guest operating system will have already generated a virtual channel program for execution within a channel sub-system and on behalf of a sub-channel. Upon entry into routine 700, execution proceeds to block 710 which translates, from virtual to absolute address mode (i.e. specifically using virtual to real address translation coupled with prefixing to generate corresponding absolute addresses), the channel program as received from the guest operating system. At this point, apart from being translated, the host channel program is the same as that provided by the guest operating system. Once this translation into absolute addressing is complete, execution proceeds to decision block 720. When executed, decision block 720 determines whether the PCI flag in the first CCW in the translated channel program has been set by the guest operating system. If this flag has not been set, and specifically if this CCW is one which requires a PCI for proper chaining, the hypervisor, routes execution, via YES path 723, to execution block 730. When executed, this latter block sets the PCI flag in this CCW. Occasionally relatively long running channel programs generated by a host operating system do not generate a PCI for the very first channel program segment. By setting the PCI flag in this fashion, the resulting translated channel program provides a significantly faster I/O transfer (and provides a concomitantly faster application execution time) than would a translated channel program that merely generated the same PCIs as required by the virtual channel program provided by the guest operating system. As described below, the hypervisor will not reflect the occurrence of the corresponding PCI back to the guest operating system. Presently, the only CCW that requires the PCI flag be set by the hypervisor is that, defined above, which contains a 1D" opcode (i.e. a write operation). All the other required hypervisor channel program processing, such as setting up a timer expiration (as described below) or modifying a TIC or No-op (opcode "03") CCW, in the guest virtual channel program is the same regardless of whether any CCW in the guest channel program had a PCI or not. Once block 730 has executed, execution proceeds to block 740. Alternatively, in the event that the PCI flag does not need to be separately set for the first CCW (as in the case of, e.g. a CCW for a read operation, i.e. opcode "92"), then execution proceeds directly from decision block 720, via NO path 727, to block 740.

Block 740, when executed, causes the hypervisor to issue a start sub-channel (SSCH) instruction to the channel sub-system to start executing the translated channel program on behalf of a sub-channel. Thereafter, the hypervisor merely waits for a response from the sub-channel or from the timer. Accordingly, upon receipt of a response, execution proceeds to decision block 750 to decode this response and provide the appropriate action. In this regard, if the response is a PCI from the sub-channel, decision block 750 routes execution, via path 755, to block 760. Block 760, when executed, invokes PCI Service routine 800, which will be described in detail below, to, inter alia, appropriately set a timer "pop". At the conclusion of routine 800, block 770 executes to return control of the sub-channel to the guest operating system, that issued the start I/O command, in order to continue with a current I/O operation now underway. At this point, the hypervisor merely waits for a subsequent response from the timer or the sub-channel, this being indicated by dashed line 775 with routine 700 effectively looping back, via line 785, to decision block 750.

Alternatively, if the timer has expired, i.e. generated a so-called timer "pop", then decision block 750 routes execution, via path 755, to block 780. This latter block, when executed, invokes Host Timer "Pop" Service routine 900, which will also be discussed below, to translate the newly added virtual channel program segment and to appropriately modify the existing translated channel program. This modification entails appending, in the manner described above, the newly translated channel program segment situated in one I/O buffer to the end of the currently executing translated channel program segment situated in another I/O buffer. Once routine 900 has fully executed, execution loops back, via path 785 to decision block 750.

Lastly, in the event that the sub-channel provides a CE/DE indication, i.e. a signal that the channel program has terminated, then decision block 750 routes execution, via path 755, to block 790. This latter block, when executed, invokes Host Sub-channel Terminate Routine 1000. This routine merely reflects the termination of the channel program to the guest operating system and cleans-up, i.e. releases, any system resources then still in use by the now terminated channel program. Once routine 1000 has fully executed, execution exits from routine 700 with control being returned to the guest operating system in order for it to re-start another I/O operation.

Figure 8B:
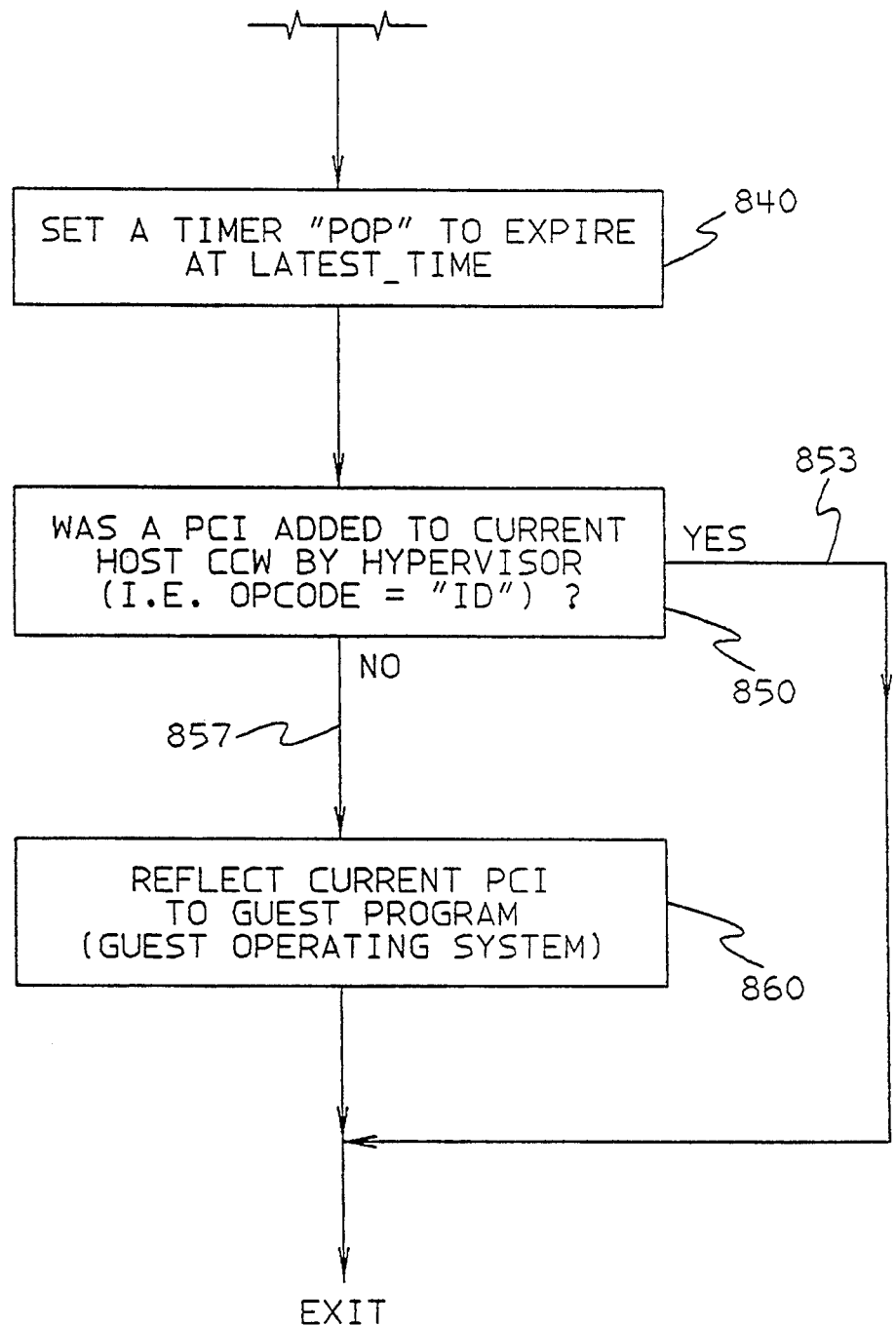

A high level flowchart of Host PCI Service routine 800, that is executed within routine 700 shown in FIGS. 7A and 7B, is collectively depicted in FIGS. 8A and 8B, for which the correct alignment of the drawing sheets is shown in FIG. 8. As described above, routine 800 is executed in response to the occurrence of a PCI. Routine 800 appropriately sets a timer "pop" such that the currently executing channel program can be extended and modified on a "just-in-time" basis to permit the current I/O operation to successfully continue.

Specifically, upon entry into routine 800, execution first proceeds to block 810. This block, when executed calculates the maximum length of time (value of parameter "TIME_INTERVAL") that is available for the host operating system to modify the currently executing translated channel program before that program would otherwise complete. The length of this interval is simply given by the time which the sub-channel requires to fully complete the current I/O transfer. Hence, this interval can be calculated from equation (1) as follows:

$$\text{TIME INTERVAL} = (\text{I/O DEVICE DATA TRANSFER RATE} * \text{BYTE COUNT}) \quad (1)$$

where:
"I/O DEVICE DATA TRANSFER RATE" is the time required for the sub-channel to transfer a single byte from its associated I/O device. For ESA/370 type computers, this rate is illustratively taken as 0.33 $\mu$seconds.

"BYTE COUNT" is the number of bytes to be transferred during the current I/O operation now underway and is specified in the CCW (e.g. read or write) for this operation.

Once block 810 has fully executed, execution proceeds to decision block 820 to determine, whether the available time is sufficiently long, based upon operational performance characteristics, of the host operating system, to permit this operating system to complete the required translation and channel program modification before the I/O operation then in process terminates. For ESA/370 type computer systems, the minimum time interval that must be available, i.e. the minimum time during which a current channel program must execute in order for the host operating system to fully complete the entire modification (translation and channel program appending), is approximately 176$\mu$ seconds. As such, if the calculated time interval is less than or equal to the minimum time interval, then the currently executing channel program will not be modified. In that case, execution will simply exit from routine 800, via NO path 823 that emanates from decision block 820.

Alternatively, if adequate time exists, i.e. the calculated time interval that the sub-channel needs to complete an I/O transfer exceeds the minimum time interval, then decision block 820 routes execution, via YES path 827, to block 830. This latter block, when executed, determines the latest possible time at which modifications (including both translating a new virtual channel program segment and appending the resulting translated channel program segment) to the currently executing channel program must begin. This time is given by equation (2) as follows:

$$\text{LATEST\_TIME} = (\text{CURRENT\_TIME} + \text{TIME\_INTERVAL} - T_L) \quad (2)$$

where:
CURRENT_TIME is actual time, as provided by a time-of-day (TOD) clock supplied by the host computer system; and $T_L$ is an empirically determined constant that reflects expected latency of the host operating system, i.e. typically the time required by the host computer system to translate a successive virtual channel program segment and append a latest channel program segment, plus an appropriate safety factor.

Once block 830 determines this latest time, execution proceed to block 840 which sets a timer, typically external to the host operating system, to expire at this particular time. Thereafter, execution proceeds to decision block 850 to determine whether to reflect the current PCI back to the guest operating system. In that regard, if the present PCI is a result of the hypervisor setting a PCI flag in a translated CCW, then this PCI is not reflected back to the guest operating system. In this case, execution simply exits from routine 800, via YES path 853 that emanates from decision block 850. Alternatively, if the PCI is to be reflected back to the guest operating system, i.e. the PCI was not the result of the hypervisor itself setting a PCI flag in the current channel program, then decision block 850 routes execution, via NO path 857, to block 860. This latter block, when executed, reflects the PCI back to the guest operating system for its use. Once block 860 has executed, execution exits from routine 800.

FIG. 9 depicts a high level flowchart of Host Timer "Pop" Service routine 900 that is also executed within routine 700 shown in FIGS. 7A and 7B. As described above, routine 900 executes in response to expiration of the timer previously set in routine 800 at the occurrence of a PCI.

Routine 900, when entered, passes control to block 910. This block causes the host operating system to translate the newly added virtual channel program segment and to appropriately modify the existing translated channel program. This modification entails appending, in the manner described above, if two I/O buffers are used, the newly translated channel program segment situated in one I/O buffer to the end of the currently executing translated channel program segment situated in the other I/O buffer. If two buffers are used, as described above, the new virtual channel program segment will be in one buffer with the translated absolute version thereof then being placed into and over-writing the virtual version in this same buffer. The other buffer will contain the currently executing channel program segment. The end of the latter segment, specifically a TIC or No-op CCW situated thereat, will then be modified to point to the first CCW in the former buffer, with the functions provided by these buffers changing with each successive I/O transfer that occurs during the current I/O operation. Once block 910 has fully executed, execution will exit from routine 900 and return to routine 700. Alternatively, if no new virtual channel program segment exists, then execution merely exits, without more, from block 900. Eventually, in this case, the channel program then executing will simply terminate and the sub-channel will end, as previously described.

FIG. 10 depicts a high level flowchart of Host Sub-channel Terminate routine 1000 that is also executed within routine 700 shown in FIGS. 7A and 7B. As discussed above, routine 1000 executes in response to a CE/DE indication provided by the sub-channel. Such an indication signifies that the channel program then executing has, in fact, just terminated.

Upon entry into routine 1000, execution proceeds to block 1010. This block, when executed, reflects the ending (final) status of the sub-channel back to the guest operating system. Once this has occurred, execution proceeds to block 1020 which, when executed, cleans-up, i.e. releases, any system resources that are presently pending in connection with either the channel program that has just terminated and/or its associated PCI processing. These resources include, e.g., pending timer requests that have not yet expired and memory locations. Once block 1020 has fully executed, execution exits from routine 1000, and ultimately returns to the guest operating system to re-start the sub-channel and initiate the next I/O operation.

Figure 11:
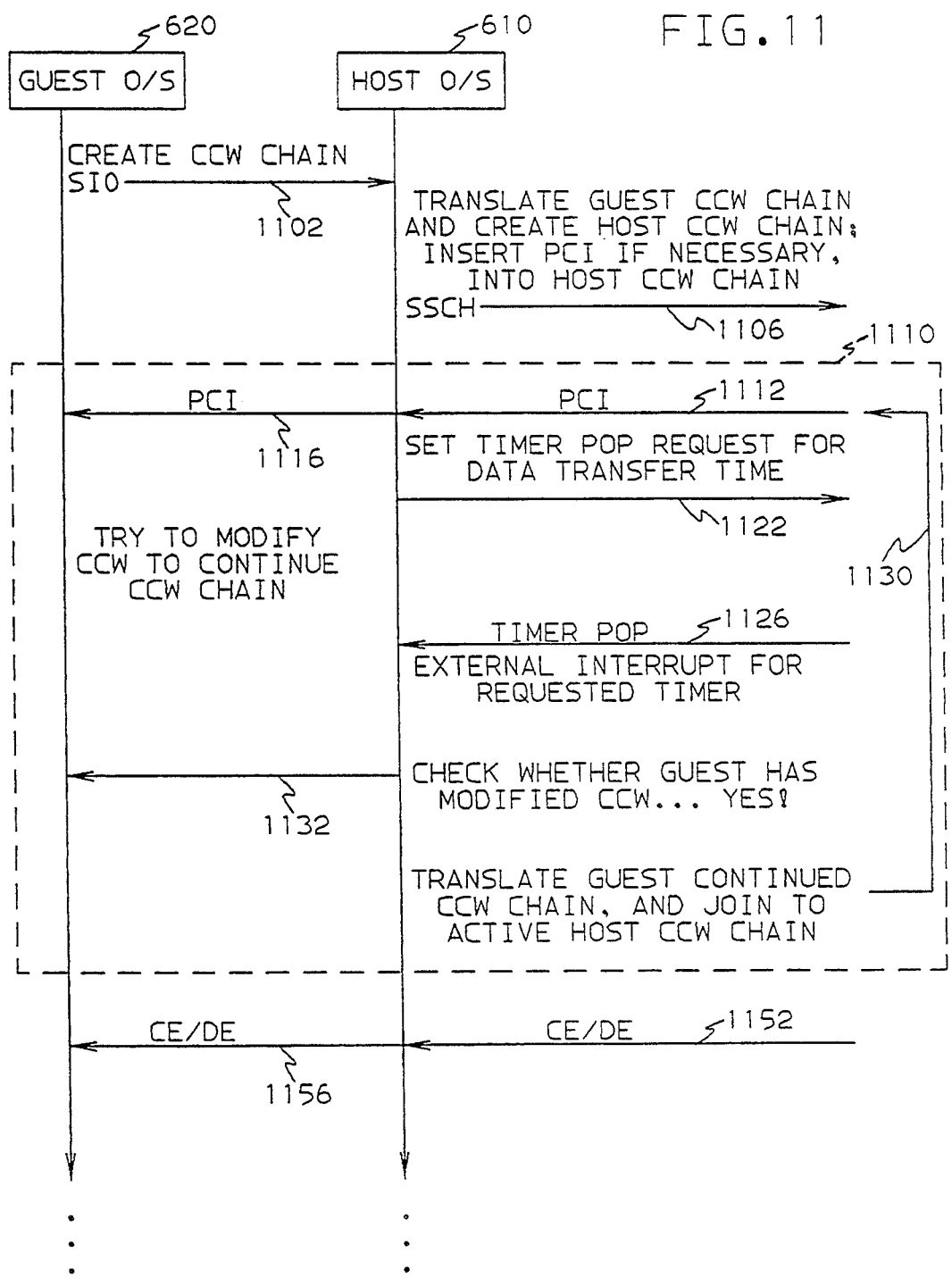
FIG. 11 diagrammatically depicts input/output (I/O) information flow between guest and host operating systems and accompanying operations, which both occur on system 10 while a channel program is being dynamically updated in accordance with our present inventive teachings.

Having provided, in detail the above implementational details of our present invention, FIG. 11 diagrammatically depicts input/output (I/O) information flow that would occur between the guest and host operating systems, along with accompanying operations, during use of our inventive technique and for those instances where a sub-channel did not prematurely terminate its I/O operations relative to the time required to update a dynamically altering channel program.

In particular, guest operating system 620 would first create a channel program, i.e. a common chain of CCWs. Thereafter, to initiate execution of this program within the channel sub-system and on behalf of a sub-channel, the guest operating system would issue, as symbolized by line 1102, a start I/O command to the host operating system. In response to this command, host operating system 610 would translate the channel program created by the guest operating system and create a corresponding translated host channel program (i.e. host CCW chain). If, as described above, the first CCW in the host channel program was such as not to cause the sub-channel to generate a PCI, then the host operating system would set the PCI flag in this CCW to generate a PCI. Once these operations occurred, then, as indicated by line 1106, host operating system 610 would initiate execution of the translated channel program in the sub-system, and on behalf of the sub-channel, by issuing a start sub-channel (SSCH) command to the channel sub-system.

Once the start sub-channel command was issued, the sub-system, on behalf of the sub-channel, would begin executing the channel program. The first CCW in this program, when executed, would cause the sub-channel to issue a PCI, as symbolized by line 1112 to host operating system 610. In the event that the PCI flag that invoked this PCI was set by the guest operating system, then host operating system 610, as symbolized by line 1116, would reflect this PCI back to the guest operating system. If, however, the PCI flag for this particular PCI was set by the host operating system, then this PCI would not be reflected back. Furthermore, in response to the PCI received by host operating system 610, the host operating system would set, as represented by line 1122, an external timer to appropriately expire and generate a timer "pop", as described above, to account for the expected time that the current data transfer, presently underway in the sub-channel, will require, less the amount of time necessitated for the translation and channel program appending operations (plus an applicable safety factor). Thereafter, control will be returned to host operating system 620 which, sometime during this occurrence of this transfer, will attempt to extend the current executing channel program by generating a new virtual channel program segment. The host operating system will remain essentially oblivious to data transfer operations then underway in the sub-channel as well as to execution of the underlying channel program until the external timer generates, as symbolized by line 1126, an external interrupt (here a timer "pop") signifying that the external timer has expired. In response to this interrupt, host operating system 610 will determine, in a conventional fashion and as symbolized by line 1132, whether the guest operating system has generated a new virtual channel program segment. If such a segment has, in fact, been generated, then host operating system 610 will appropriately translate this new segment and then append the resulting translated channel program segment to the currently executing channel program (such as by changing the address in a TIC or No-op CCW), both operations being conducted in the manner described above. If these operations were completed in time, then, as shown, the host operating system will await the next occurrence of a PCI to once again set a timer "pop" and so forth As such, as long as guest operating system 620 generates each additional new segment of virtual channel program and that segment is translated and appended to the currently executed channel program in sufficient time, then, with respect to the channel program itself, the host and guest operating systems will remain in a loop indicated by dot-dashed line 1130 with the operations and responses contained within dashed box 1110 repetitively occurring. Eventually, the guest operating system will not extend the channel program at which point, after the last record has been transferred, the channel program will terminate. As result and as indicated by line 1152, the sub-channel will generate a CE/DE indication to the host operating system which, as symbolized by line 1156, will reflect this indication back to the guest operating system to re-start the sub-channel and execute a new channel program, and so forth.

In contrast, FIG. 12 diagrammatically shows I/O information flow that would occur between the guest and host operating systems and accompanying operations whenever a dynamic modification of a channel program would be too slow relative to an I/O transfer through an associated sub-channel.

In particular and identical to that shown in FIG. 11, guest operating system 620, as depicted in FIG. 12, would first create a channel program. Thereafter, guest operating system 620 would issue, as symbolized by line 1205, a start I/O command to the host operating system to initiate execution of this program. In response to this command, host operating system 610 would translate the newly created guest virtual channel program and create a corresponding translated host channel program. Again, if, as described above, the first CCW in the host channel program was such as not to cause the sub-channel to generate a PCI, then the host operating system would set the PCI flag in this CCW to generate a PCI. Once these operations occurred, then, as indicated by line 1210, host operating system 610 would initiate execution of the translated channel program in the sub-channel by issuing a start sub-channel (SSCH) command to the channel sub-system.

Once the SSCH command was issued, the channel sub-system, on behalf of the sub-channel, would begin executing the channel program. The first CCW in this program, when executed, would cause the sub-channel to issue a PCI, as symbolized by line 1215 to host operating system 610. In the event that the PCI flag that invoked this PCI was set by the guest operating system, then host operating system 610, as symbolized by line 1220, would reflect this PCI back to the guest operating system. If, however, the PCI flag for this particular PCI was set by the host operating system, then this PCI would not be reflected back. Furthermore, in response to the PCI received by host operating system 610, the host operating system would set, as represented by line 1225, an external timer to appropriately expire and generate a timer "pop", as described above, to account for the expected time that the current data transfer, presently underway in the sub-channel, will require. Thereafter, control will be returned to host operating system 620 which, sometime during this occurrence of this transfer, will attempt to extend the current executing channel program by generating a new virtual channel program segment.

Now, if, prior to the time at which the channel program would have been successfully extended, the current I/O operation finishes and hence the channel program terminates, then the sub-channel will return a CE/DE indication, as symbolized by line 1230, to host operating system 610. Since this indication will occur before the host operating system has fully appended a new channel program segment onto the current channel program, then the guest operating system will be constrained to re-start the channel sub-system, on behalf of a sub-channel, and execute a new channel program. Specifically, in response to the CE/DE indication, host operating system 610 would undertake appropriate "clean-up" operations, as discussed below, e.g. by un-translating a current CCW, canceling any pending timer request(s) and releasing any memory locations associated with the now terminated channel program and/or its associated PCI processing. Thereafter, as symbolized by line 1235, host operating system 610 will reflect the CE/DE indication back to guest operating system 620. In response to this indication, the guest operating system will create a new virtual channel program and, once having accomplished this, will issue a start I/O command, as symbolized by line 1240, to re-start the sub-channel. Thereafter, as symbolized by lines 1245, 1250, 1255 and 1260, the channel sub-system, along with the host and guest operating systems, will proceed to translate this new virtual channel program (and set the PCI flag, as appropriate), set a corresponding timer "pop" and, as the need arose for each successive record to be transferred, extend the virtual channel program, and append and modify the then executing channel program, as required, and so forth.

We have implemented our inventive technique and have experimentally confirmed that its use in a host operating system, executing in a non-channel DAT based host computer system, that emulates a guest computer system which utilizes channel DAT, provides significantly reduced I/O transfer time and hence a significant improvement in guest application processing time, particularly for applications requiring a substantial amount of I/O operations, than would otherwise occur.

By now those skilled in the art will clearly recognize that although we have described our invention in connection with updating dynamically altering channel programs in a manner that emulates channel DAT, our invention is not so limited. In particular, our inventive teachings can be readily applied to any situation where one software layer produces a channel program that is subsequently translated into a new channel program by another software layer, e.g. by EXCP which is a feature presented on the IBM MVS operating system and one that provides the appearance of channel DAT, and then executed by a channel sub-system. In this regard, our invention could be used to provide enhanced performance in a wide range of different processing environments by providing dynamic modification, through use of the PCI, of channel programs that have been statically translated.

Furthermore, although we have described our invention in the context of use with a disk drive, e.g. a DASD, our inventive teachings are applicable to use in conjunction with updating a channel program that controls an I/O transfer for any of a wide variety of different I/O devices, such as tape drives, optical disk drives and other electro-mechanical storage devices, where based on device and sub-channel performance characteristics, that channel program needs to be dynamically extended to permit an increased I/O data transfer rate to occur through the device.

Although a single embodiment which incorporates the teachings of our present invention has been shown and described in detail herein, those skilled in the art can readily devise many other varied embodiments that still incorporate these teachings.

We claim:

1. A method of controlling channel operations in a first computer system, wherein said first computer system includes a channel sub-system means for executing a sequence of said channel operations in accordance with a first form of a channel program defined by program signals located in said first computer system, wherein said channel program includes initial and successive program portions corresponding to respective initial and successive channel operation portions of the sequence of channel operations, wherein said first computer system further includes means for executing a first program means for generating a second form of the initial program portion and extending said channel program by dynamically generating, in said second form, the successive program portions while said channel sub-system means executes said channel operations specified by said first form of said channel program, and wherein said first computer system further includes means for executing a second program means for updating said channel program by performing the method steps of:

setting, in response to a pre-defined interrupt signal transmitted from said channel sub-system means to said second program means during execution of said channel operations, a timer located in said first computer system to generate a trigger signal after a pre-determined time period has elapsed, wherein said pre-determined time period defines a first time at which alterations, are to begin, said alterations being to one of said program portions, such that said alterations can be completed prior to a second time at which execution of a corresponding channel operation portion would complete and execution of said channel program would terminate, and wherein said pre-determined time period occurs during an execution time period when the corresponding channel operation portion is occurring; and modifying, in response to said trigger signal, said program signals defining the channel program portion being executed by said channel sub-system means in accordance with the steps of:
determining when said first program means has generated a next one of said channel program portions;
translating said next one of said successive channel program portions from said second to said first form to form translated program signals defining a new translated channel program portion, wherein said new translated channel program portion causes said pre-defined interrupt signal to be transmitted when said channel sub-system means begins executing a corresponding one of said operation portions specified by said new translated channel portion; and
appending said new translated channel program portion onto said channel program then executing in said channel sub-system means.

2. The method in claim 1 further comprising the step of repeating said timer setting and program signals modifying steps for each subsequent one of said successive channel program portions generated by said first program means, wherein said channel program then being executed by said channel sub-system means is updated by said second program means in a manner such that such successive one of said channel operation portions completes prior to terminating execution of said sequence of channel operations.

3. The method in claim 2 wherein said interrupt signal is a program controlled interrupt (PCI) signal.

4. The method in claim 3 further comprising the steps of:
translating via said second program means said initial program portion of said channel program from said second to said first form to yield an initial translated channel program portion; and
executing said initial translated channel program portion in said channel sub-system means to execute a corresponding channel operation portion.

5. The method in claim 4 wherein said next successive channel program portion translating step comprises the step of changing said initial translated channel program portion to cause the channel sub-system means to generate a PCI signal while executing said initial translated channel program portion.

6. The method in claim 4 wherein said modifying step further comprises the step of terminating execution of one of said channel program portions by said channel sub-system means at the conclusion of execution of said corresponding channel operation portion.

7. The method in claim 5 wherein said first program means is a guest operating system of a second computer system that employs dynamic address translation (DAT) in a channel sub-system means, said second program means is a host operating system of said first computer system, and said translating step perform DAT when translating said successive channel program portions from said second to said first form.

8. The method in claim 7 wherein said first computer system further comprises a main storage and an input/output (I/O) device connected to said main storage through said channel sub-system means, and wherein said method of controlling channel operations includes the step of transferring a successive unit of information signals between said I/O device and said main storage via said channel sub-system means.

9. The method in claim 8 wherein said setting step further comprises the step of:
ascertaining said pre-determined time period by multiplying signal representing a single byte transfer rate of said I/O device by signals representing a number of bytes to be transferred during execution of said corresponding channel operation portion; and activating said timer to generate said trigger signal at said first time, wherein said first time equals a sum of values representing said pre-determined time period and a current time of day less a pre-defined time amount.

10. The method in claim 8 wherein said transferring step includes performing said transferring step using absolute addressing as said first form of said channel program and using virtual addressing as said second form of said program portions.

11. The method in claim 10 wherein said translating step comprises the steps of:

translating said next successive channel program portion from virtual to real addressing so as to generate a real address channel program portion; and converting, through prefixing using a pre-fined prefix, said real address channel program portion from real to absolute addressing so as to form said new translated channel program portion.

12. The method in claim 8 wherein each of said channel program portions comprises a sequence of channel command words (CCWs) and said main storage comprises at least first and second I/O buffers, wherein said channel program being executed is situated in the first I/O buffer and said new translated channel program portion is situated in the second I/O buffer, and said appending step comprises the step of altering a CCW in said first buffer to point to a first CCW in said second buffer.

13. A method of controlling an input/output (I/O) operation in a first computer system having a main storage, an I/O device and a channel sub-system means connected between said main storage and said I/O device, wherein said channel sub-system means controls said I/O operation for transferring information signals between said device and said main storage, wherein said sub-system means executes said I/O operation in accordance with a channel program defined by first program signals located in said first computer system in absolute address form, wherein said first computer system executes a guest operating system of a second computer system that employs dynamic address translation (DAT) in a channel sub-system used therein, wherein said guest operating system generates an initial program portion of said channel program defined by second program signals in virtual address form for executing an initial operation portion of said I/O operation and extends said channel program by dynamically generating, in virtual address form, successive program portion of said channel program while said channel sub-system means is executing said I/O operation, wherein execution of each of said successive channel program portions by said channel sub-system means causes execution of a corresponding successive operation portion of said I/o operation by transferring information signals between said I/O device and said main storage, and wherein said first computer system includes a host operating system performing a method for updating said channel program comprising the steps of:

setting, in response to a programmed controlled interrupt (PCI) signal received from said channel sub-system means, a timer to generate a trigger signal after a pre-determined time period has elapsed, wherein said pre-determined time period defines, during an execution time period while a corresponding operation portion of said I/O operation is occurring, a first time at which alterations, are to begin, said alterations being to said channel program, then executing in said channel sub-system means, such that said alterations can be completed prior to a second time at which said operation would complete and said executing channel program would terminate;

modifying, in response to said trigger signal generated from the time at the conclusion of said time period, said first program signals representing said channel program being executed by said channel sub-system means, said modifying step comprising the steps of:

determining if said guest operating system has generated a next one of said successive channel program portions;

translating said next successive one of said channel program portions from said virtual to said absolute form to form a new translated channel program portion wherein said new translated channel program portion causes said channel sub-system means to transmit said PCI signal to said host operating system when said channel sub-system means begins performing a corresponding one of said operation portions specified by said new translated channel program portion;

appending said new translated channel program portion onto said channel program then executing in said channel sub-system means; and repeating said setting and modifying steps for each subsequent one of said successive channel program portions generated by said guest operating system wherein said channel program being executed by said channel sub-system means performs each successive one of said operation portions prior to terminating said I/O operation.

14. The method in claim 13 further comprising the steps of:

translating, via said host operating system, said initial program portion of said channel program from the virtual to said absolute address form to yield an initial translated channel program portion; and executing said initial translated channel program portion in said channel sub-system means to execute a corresponding channel operation portion.

15. The method in claim 14 wherein said next successive channel program portion translating step comprises the step of changing said initial translated channel program portion to cause the channel sub-system means to generate a PCI signal while executing said initial translated channel program portion.

16. The method in claim 15 wherein said modifying step further comprises the step of terminating execution of one of said channel program portions by said channel sub-system means at the conclusion of execution of said corresponding channel operation portion.

17. The method in claim 15 wherein said setting step further comprises the step of:

ascertaining said pre-determined time period by multiplying signals representing a single byte transfer rate of said I/O device by signals representing a number of bytes to be transferred during execution of said corresponding channel operation portion; and activating said timer to generate said trigger signal at said first time, wherein said first time equals a sum of values representing said pre-determined time period and a current time of day less a pre-defined time amount.

18. The method in claim 15 wherein said translating step comprises the steps of:
    translating said next successive channel program portion from the virtual address form to real address form so as to generate a real address channel program portion; and
    converting, through prefixing using a pre-defined prefix, said real address channel program portion from the real address form to the absolute address form so as to form said new translated channel program portion.

19. The method in claim 15 wherein each of said channel program portions comprises a sequence of channel command words (CCWs) and said main storage comprises at least first and second I/O buffers, wherein said channel program being executed is situated in the first I/O buffer and said new translated channel program portion is situated in the second I/O buffer, and said appending step comprises the step of altering a CCW in said first buffer to point to a first CCW in said second buffer.

20. In a first computer system having a channel sub-system means for controlling a channel operation and executing program signals which define a first form of a channel program to perform said channel operation, and a first program means executed by said first computer system for generating, in a second form, an initial program portion of said channel program for executing an initial operation portion of said channel operation and extending said channel program by dynamically generating, in said second form, successive portions of said channel program while said channel sub-system means executes said channel program, wherein each execution of said successive channel program portions causes execution of a corresponding successive operation portion of said channel operation, channel program updating apparatus, operative in conjunction with a second program means for executing in said first computer system, comprising:
    means for setting, in response to an interrupt signal transmitted by said channel sub-system means, a timer to generate a trigger signal after a pre-determined time period has elapsed, wherein said pre-determined time period defines, during an execution time period while said channel sub-system means executes a corresponding channel operation portion, a first time at which alterations, are to begin, said alterations being to said channel program then executing by said sub-system means, such that said alterations can be completed prior to a second time at which said corresponding operation portion would complete and execution of said executing channel program would terminate; and
    means for modifying, in response to said trigger signal, said program signals defining said channel program portion being executed by said channel sub-system means, said modifying means comprising:
        means for determining when said first program has generated a next one of said successive channel program portions;
        means for translating said next successive one of said channel program portions from said second to said first form to form translated program signals defining a new translated channel program portion, wherein said new translated channel program portion causes said interrupt signal to be transmitted when said channel sub-system means begins executing a corresponding one of said operation portions specified by said new translated channel program portion; and
        means for appending said new translated channel program portion onto said channel program portion executing in said channel sub-system means.

21. The apparatus in claim 20 wherein said interrupt signal is a program controlled interrupt (PCI) signal.

22. The apparatus in claim 21 further comprising:
    means for translating, via said second program means, said initial program portion of said channel program from said second to said first form to yield an initial translated channel program portion; and
    means for executing said initial translated channel program portion in said channel sub-system means to execute a corresponding channel operation portion.

23. The apparatus in claim 22 wherein said next successive channel program translating means comprises means for changing said initial translated channel program portion to cause said channel sub-system means to generate a PCI signal while executing said initial translated channel program portion.

24. The apparatus in claim 23 wherein said first program means is a guest operating system of a second computer system that employs dynamic address translation (DAT) in a channel sub-system means, and said second program means is a host operating system of said first computer system.

25. The apparatus in claim 24 wherein said first computer system further comprises a main storage and an input/output (I/O) device connected to said main storage through said channel sub-system means, and wherein said channel operation is an input/output operation between said main storage and said I/O device with each channel operation portion being a transfer of a successive unit of information signals between said I/O device and said main storage via said channel sub-system means.

26. The apparatus in claim 25 wherein said means for setting further comprises:
    means for ascertaining said pre-determined time period by multiplying signals representing a single byte transfer rate of said I/O device by signals representing a number of bytes to be transferred during execution of said corresponding channel operation portion; and
    means for activating said timer to generate said trigger signal at said first time, wherein said first time equals a sum of values representing said pre-determined time period and a current time of say less a pre-defined time amount.

27. The apparatus in claim 26 wherein said first form is absolute addressing and said second form is virtual addressing.

28. The apparatus in claim 27 wherein said translating means comprises:
    means for translating said next successive channel program portion from virtual to real addressing so as to generate a real address channel program portion; and
    means for converting, through prefixing using a pre-defined prefix, said real address channel program portion from real to absolute addressing so as to form said new translated channel program portion.

29. The apparatus in claim 25 wherein each of said channel program portions comprises a sequence of channel command words (CCWs) and said main storage comprises at least first and second I/O buffers, wherein said channel program being executed is situated in the first I/O buffer and said new translated channel program portion is situated in the second I/O buffer, and said appending means comprises means for altering a CCW in said first buffer to point to a first CCW in said second buffer.

* * * * *